US008201198B2

(12) United States Patent
Tsunokawa et al.

(10) Patent No.: US 8,201,198 B2
(45) Date of Patent: Jun. 12, 2012

(54) INFORMATION PROCESSING SYSTEM, INFORMATION PROCESSING APPARATUS AND METHOD, RECORDING MEDIUM, AND COMPUTER PROGRAM

(75) Inventors: Motoki Tsunokawa, Chiba (JP); Hiroko Hirosawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 10/545,211

(22) PCT Filed: Feb. 19, 2004

(86) PCT No.: PCT/JP2004/001949
§ 371 (c)(1),
(2), (4) Date: Apr. 11, 2006

(87) PCT Pub. No.: WO2004/075543
PCT Pub. Date: Sep. 2, 2004

(65) Prior Publication Data
US 2006/0225095 A1    Oct. 5, 2006

(30) Foreign Application Priority Data

Feb. 24, 2003 (JP) ................................ 2003-046438
Feb. 25, 2003 (JP) ................................ 2003-047569

(51) Int. Cl.
*G06F 3/00* (2006.01)
*G06F 13/00* (2006.01)
*H04N 5/445* (2011.01)
(52) U.S. Cl. ........................................................ 725/39
(58) Field of Classification Search ...................... 725/39
See application file for complete search history.

(56) References Cited

U.S. PATENT DOCUMENTS

| | | | |
|---|---|---|---|
| 5,502,504 A * | 3/1996 | Marshall et al. | 725/47 |
| 6,122,011 A * | 9/2000 | Dias et al. | 348/569 |
| 6,169,543 B1 * | 1/2001 | Wehmeyer | 725/47 |
| 6,262,722 B1 * | 7/2001 | Allison et al. | 725/39 |
| 6,487,722 B1 * | 11/2002 | Okura et al. | 725/40 |
| 6,675,387 B1 * | 1/2004 | Boucher et al. | 725/105 |
| 7,039,936 B1 * | 5/2006 | Inoue et al. | 725/59 |

(Continued)

FOREIGN PATENT DOCUMENTS

| | | | |
|---|---|---|---|
| JP | 07-093306 A | 4/1995 |
| JP | 08-102922 A | 4/1996 |
| JP | 10-028244 A | 1/1998 |

(Continued)

*Primary Examiner* — Brian Pendleton
*Assistant Examiner* — Jonathan V Lewis
(74) *Attorney, Agent, or Firm* — Lerner, David, Littenberg, Krumholz & Mentlik, LLP

(57) ABSTRACT

An information processing system, an information processing apparatus and method, a recording medium, and a computer program can easily provide a user with program information, which is easier to see for the user, and display the program information on a limited screen space effectively. An EPG server of the service provider creates EPG information on the basis of information on programs of a broadcasting station and lays open the EPG information to the outside of the EPG server. An editing server acquires and edits the EPG information periodically at predetermined intervals and lays open edited EPG information to the public. A hard disk recorder requests the edited EPG information from the editing server through a network on the basis of an instruction of a user and causes a monitor to display the edited EPG information supplied from the editing server on the basis of the request. The invention can be applied to an EPG providing system.

9 Claims, 35 Drawing Sheets

U.S. PATENT DOCUMENTS

| | | | |
|---|---|---|---|
| 7,076,733 B2 * | 7/2006 | Smith | 715/716 |
| 7,469,413 B1 * | 12/2008 | Mizutome et al. | 725/48 |
| 2001/0015972 A1 | 8/2001 | Horiguchi et al. | |
| 2002/0007377 A1 | 1/2002 | Ogishi et al. | |
| 2002/0060750 A1 * | 5/2002 | Istvan et al. | 348/569 |
| 2003/0005440 A1 * | 1/2003 | Axelsson et al. | 725/39 |
| 2003/0070168 A1 * | 4/2003 | Stone | 725/37 |
| 2006/0117348 A1 * | 6/2006 | D'Souza et al. | 725/40 |

FOREIGN PATENT DOCUMENTS

| | | |
|---|---|---|
| JP | 2001-184395 A | 7/2001 |
| JP | 2001-312443 A | 11/2001 |
| JP | 2002-91420 A | 3/2002 |
| JP | 2002-209155 A | 7/2002 |
| JP | 2002-329119 A | 11/2002 |
| JP | 2003-169267 A | 6/2003 |

* cited by examiner

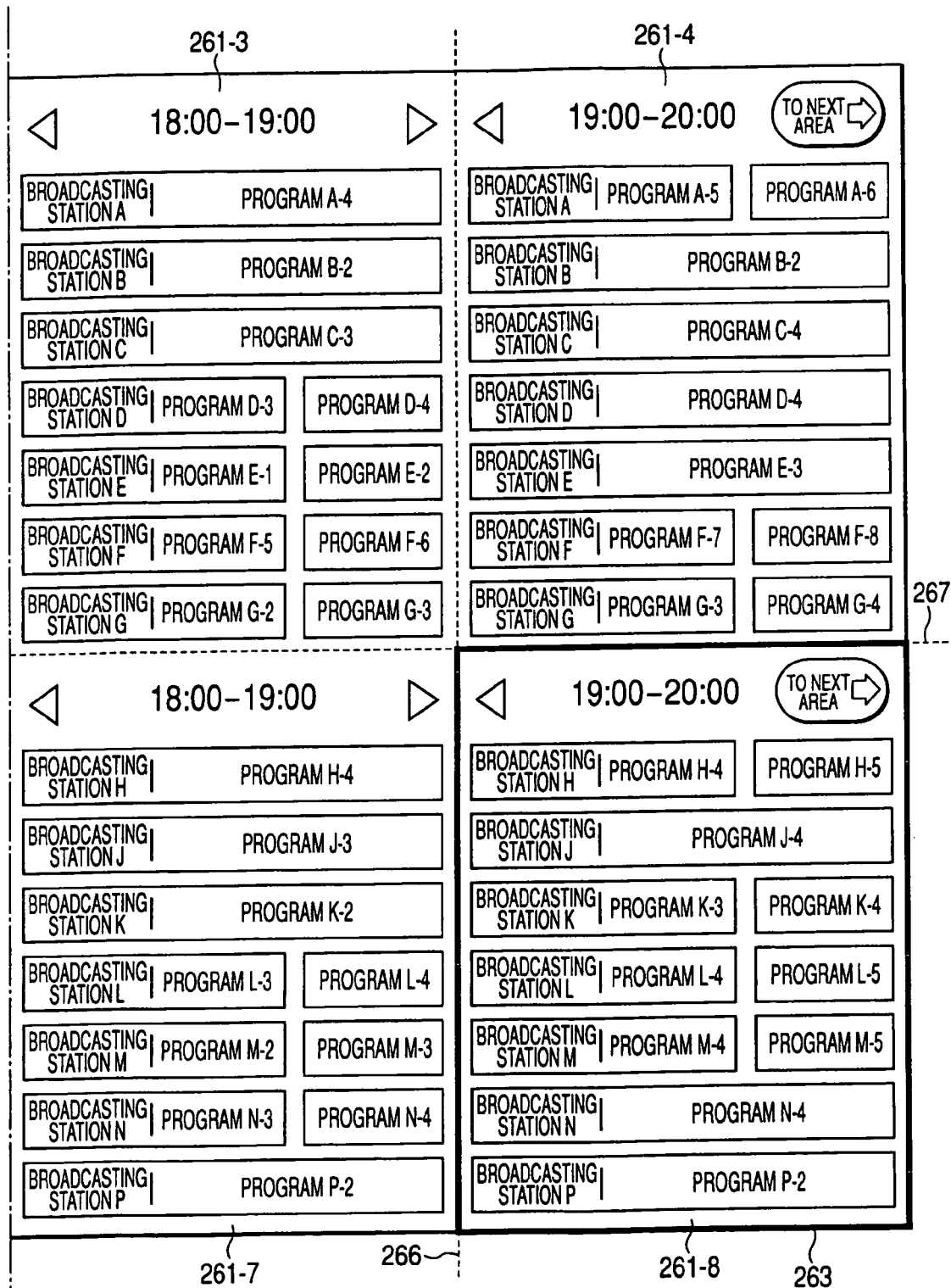
(FIG. 12 CONTINUED)

INFORMATION PROCESSING SYSTEM, INFORMATION PROCESSING APPARATUS AND METHOD, RECORDING MEDIUM, AND COMPUTER PROGRAM

BACKGROUND OF THE INVENTION

The present invention relates to an information processing system, an information processing apparatus and method, a recording medium, and a computer program, and in particular to an information processing system, an information processing apparatus and method, a recording medium, and a computer program that can easily provide a user with program information, which is easier to see for the user, and display the program information on a limited screen space effectively.

In recent years, in television broadcasts and the like, there is a service in which an EPG (Electronic Program Guide), which is program guide information in electronic data indicating a broadcast schedule for programs, equivalent to a so-called radio and television program section of a newspaper is provided to users who are viewers of the television broadcasts. For example, there is a method with which a broadcasting station inserts an EPG concerning programs of the own station into a vertical blanking period of video signals of broadcast contents and provides users with the EPG. In this case, since the broadcasting station, which broadcasts the programs, provide the EPG, contents of the EPG provided include only information on the programs of the broadcasting station.

On the other hand, there is a service, for example, by a company different from a broadcasting station, for providing an EPG including information on programs of plural broadcasting stations like the radio and television program section in a newspaper through the Internet or the like. In this case, a provider of the EPG acquires information such as broadcast schedules from the respective broadcasting stations, creates the EPG in an HTML (HyperText Markup Language) format or the like on the basis of the information and uploads the EPG to a server or the like.

A user uses a terminal apparatus to make connection to the server and request the EPG from the server. The terminal apparatus includes a household appliance, which has an Internet connection function and is capable of inspecting the EPG, such as a television receiver, a hard disk recorder, a DVD recorder, or a tuner or an electronic information apparatus, which has the internet connection function and is capable of inspecting the EPG, such as a personal computer, a PDA, or a cellular phone. The server supplies the requested EPG to the terminal apparatus, which is a request source, as a WEB page. The terminal apparatus displays the supplied EPG using a WEB browser.

FIG. 1 is a diagram showing an example of the EPG created in the server. In FIG. 1, an EPG 11 is a WEB content described in the HTML. In the EPG 11, plural broadcasting stations are arranged in an abscissa axis direction and programs scheduled to be broadcasted in respective stations are shown in an ordinate axis direction along the passage of time.

In short, in the EPG 11 in FIG. 1, programs that the broadcasting stations schedule to broadcast from 12 o'clock to 16 o'clock are displayed. For example, a broadcasting station A broadcasts a program A-1 from 12 o'clock, broadcasts a program A-2 from 12:30, broadcasts a program A-3 from 13 o'clock, broadcasts a program A-4 from 14 o'clock, broadcasts a program A-5 from 15 o'clock, and broadcasts a program A-6 from 15:30.

Incidentally, as contents of the EPG, information such as start time and end time of programs, titles of programs, topics of contents, and performers is possible. However, if the server supplies these kinds of information for all the programs, which are broadcasted from the respective stations, at a time, data unnecessary for the user increases, which is extremely inefficient.

Thus, the server divides the EPG for each predetermined time to generate EPGs as plural WEB contents (create an EPG for each predetermined time). The server supplies only the EPGs of a time frame designated by the terminal apparatus or reduces the number of items of information on the respective programs to reduce an amount of information. Nevertheless, a display size of the EPG 11 in FIG. 1, which is created by the server and supplied to the terminal apparatus, is usually larger than a screen size of a display of the terminal apparatus (a size of a display area of the WEB browser). Thus, only a part of the EPG 11 is displayed in a display area 12 of the terminal apparatus.

In particular, in a television receiver or the like that receives a ground wave television broadcast, resolution of a display of the television receiver is low and a size of the area 12, which is an area of the displayed EPG 11, is small.

In other words, a general EPG such as the EPG 11 is suitable for display on a high resolution monitor with a large display image size.

Therefore, there is a method of allowing a user to perform operation to thereby move (scroll) a position of an EPG, which is displayed by a low resolution display of a terminal apparatus, to make it possible to display the entire EPG 11 (see, for example, JP-A-8-102922).

For example, in FIG. 1, when the area 12, which is an upper left part of the EPG 11, is displayed, programs of the broadcasting stations E to H are not displayed. When the user operates the display area of the EPG 11 and scrolls the display area in a vertical direction and a horizontal direction to thereby make a position of an area 13 of the EPG 11 displayed, programs from 14 o'clock to 16 o'clock of the broadcasting stations E to H, which have not been displayed, are displayed. In this way, even if a monitor of the terminal apparatus is a low resolution monitor, the terminal apparatus can display the entire EPG 11.

However, in the EPG 11 described above, for example, when the area 13 is displayed, since neither broadcasting station names nor time frames are displayed, there is a problem in that the user cannot see which part of the EPG 11 the user is inspecting.

FIG. 2 is a diagram showing an example of display in the case in which the area 13 of the EPG 11 is displayed on a display (a WEB browser) of the terminal apparatus.

In FIG. 2, the EPG 11 (the area 13) is displayed on the WEB browser 21. A vertical scroll bar 22 and a horizontal scroll bar 23 are displayed on the WEB browser 21. For example, the user can change an area of the EPG 11 displayed on the WEB browser 21 by operating the vertical scroll bar 22 and the horizontal scroll bar 23.

However, on the WEB browser 21, only information such as programs names is displayed and broadcasting station names and time frames are not displayed.

Note that, in FIG. 2, for explanation, the respective broadcasting stations and codes of programs broadcasted by the broadcasting stations are associated with one another like, for example, programs F-1 to F8 for programs of the broadcasting station F. However, actually, since information such as titles of programs is displayed, it is difficult for the user to associate these kinds of information with the broadcasting stations that broadcast the programs.

Therefore, the user has to memorize contents (broadcasting stations, time frames, etc.) of the entire EPG 11 in order to grasp broadcasting stations and time frames of displayed programs. Thus, there is a problem in that, if the user is unaccustomed to operation or depending on an operation method or the like, the user cannot see which part of the EPG 11 the user is inspecting.

To cope with this problem, it is conceivable to adopt a method of dividing the display area of the WEB browser 21 into plural frames and displaying broadcasting station names, times frames, and the like of the displayed EPG 11 in a frame different from a frame in which the EPG 11 is displayed. However, for that purpose, the pieces of information to be displayed in the respective frames have to be synchronized and a displayed image has to be reconstructed in the terminal apparatus. This requires complicated processing and increases processing time.

As shown in FIGS. 1 and 2, in the EPG 11, when a size of a space, in which information such as titles of respective programs (program information) is displayed, is determined on the basis of a broadcasting time length, there is a problem in that the EPG 11 is inefficient concerning display of the program information.

For example, when the number of characters of program information of a certain program is small compared with a size of a space determined on the basis of a broadcasting time of the program, it is likely that a blank space (an excess space) is formed in the space of the program in the EPG 11 and an amount of information (the number of characters) of program information displayed on one screen (e.g., in the area 12 or the area 13) decreases.

Conversely, for example, when the number of characters of program information of a certain program is large compared with a size of a space determined on the basis of a broadcasting time of the program, it is likely that a loss of the program information occurs, for example, all the characters of the program information cannot be displayed in the space of the program in the EPG 11 and a part of the characters are displayed.

SUMMARY OF THE INVENTION

The invention has been devised in view of such circumstances and makes it possible to easily provide a user with program information, which is easier to see for the user, and display the program information on a limited screen space effectively.

A first information processing system of the invention includes a first information processing apparatus that provides information on broadcast content through a network; a second information processing apparatus connected to the network for communicating with the first information processing apparatus; and a third information processing apparatus connected to the network for communicating with the second information processing apparatus. The first information processing system includes first supplying means for supplying the information on the broadcast content to the second information processing apparatus; the second information processing apparatus includes first acquiring means for acquiring the information on the broadcast content from the first information processing apparatus; editing means for editing the information on the broadcast content to form an image corresponding to the information on the broadcast content with an image size larger than a size of a display screen on which the image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen; and second supplying means for supplying the edited information on the broadcast content to the third information processing apparatus; and the third information processing apparatus includes second acquiring means for acquiring the edited information on the broadcast content from the second information processing apparatus; and display control means for controlling display of the image corresponding to the edited information on the broadcast content.

An information processing apparatus of the invention includes editing means for editing information on broadcast content to form a first image corresponding to the information on the broadcast content with an image size larger than a size of a display screen on which the first image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen.

It is possible to constitute the information processing apparatus such that the editing means edits the information on the broadcast content such that the first image has a constitution in which the broadcast schedule of the broadcast content, the broadcasting station names corresponding to the broadcast schedule, the times corresponding to the broadcast schedule, and the function button or the mark are arranged in predetermined positions, and plural second images are arranged, the second images having an image size which is the same as the size of the display screen.

It is possible to constitute the information processing apparatus such that the plural second images include image combinations of the broadcast station names and the times which are different from one another, and the editing means edits the information on the broadcast content such that the first image has a constitution in which the image combinations are arranged.

It is possible to constitute the information processing apparatus to further include requesting means for requesting the information on the broadcast content from another information processing apparatus that provides the information on the broadcast content; and acquiring means for acquiring the information on the broadcast content from the another information processing apparatus on the basis of a request from the requesting means, and such that the editing means edits the information on the broadcast content acquired by the acquiring means.

It is possible to constitute the information processing apparatus to further include storing means for storing the edited information on the broadcast content.

It is possible to constitute the information processing apparatus to further include supplying means for supplying the edited information on the broadcast content to another information processing apparatus.

It is possible to constitute the information processing apparatus to further include display control means for controlling display of the first image corresponding to the edited information on the broadcast content.

An information processing method of the invention includes editing information on broadcast content to form a first image corresponding to the information on the broadcast content with an image size larger than a size of a display screen on which the first image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen.

A computer program recorded in a recording medium of the invention causes a computer to perform an information processing method. The information processing method includes editing information on broadcast content to form a first image corresponding to the information on the broadcast content with an image size larger than a size of a display screen on which the first image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen.

An information processing system of the invention includes a processor operable to execute instructions; and instructions for performing an information processing method, the method including editing information on broadcast content to form a first image corresponding to the information on the broadcast content with an image size larger than a size of a display screen on which the first image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen.

A second information processing system of the invention includes a first information processing apparatus that provides information on broadcast content through a network; and a second information processing apparatus connected to the network for communicating with the first information processing apparatus. The first information processing apparatus includes first supplying means for supplying the information on the broadcast content to the second information processing apparatus; and the second information processing apparatus includes first acquiring means for acquiring the information on the broadcast content from the first information processing apparatus; editing means for editing the information on the broadcast content to form an image corresponding to the information on the broadcast content with an image size larger than a size of a display screen on which the image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen; and display control means for controlling display of the image corresponding to the edited information on the broadcast content.

The first information processing system of the invention includes the first information processing apparatus that provides information on broadcast content through a network, the second information processing apparatus that is connected to the network and that communicates with the first information processing apparatus, and the third information processing apparatus that is connected to the network and that communicates with the second information processing apparatus. In the first information processing apparatus, the information on the broadcast content is supplied to the second information processing apparatus. In the second information processing apparatus, the information on the broadcast content supplied from the first information processing apparatus is acquired and is edited to form an image corresponding to the information on the broadcast content with an image size larger than a size of a display screen on which the image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen. The edited information on the broadcast content is supplied to the third information processing apparatus. In the third information processing apparatus, the edited information on the broadcast content supplied from the second information processing apparatus is acquired and the display of an image corresponding to the edited information on the broadcast content is controlled.

In the information processing apparatus and method, the recording medium, and the computer program of the invention, information on broadcast content is edited to form a first image corresponding to the information on the broadcast content with an image size larger than a size of a display screen on which the first image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen.

The second information processing system of the invention includes the first information processing apparatus that provides information on broadcast content through a network and the second information processing apparatus connected to the network for communicating with the first information processing apparatus. In the first information processing apparatus, the information on the broadcast content is supplied to the second information processing apparatus. In the second information processing apparatus, the information on the broadcast content supplied from the first information processing apparatus is acquired and is edited to form an image corresponding to the information on the broadcast content with an image size larger than a size of a display screen on which the image is displayed and with a constitution in which a broadcast schedule of the broadcast content, broadcasting station names corresponding to the broadcast schedule, times corresponding to the broadcast schedule, and a function button or a predetermined mark for changing the broadcast schedule, which is displayed by operation of a user, are always displayed in the display screen. The display of the image corresponding to the edited information on the broadcast content is controlled.

DETAILED DESCRIPTION

Figure 3:
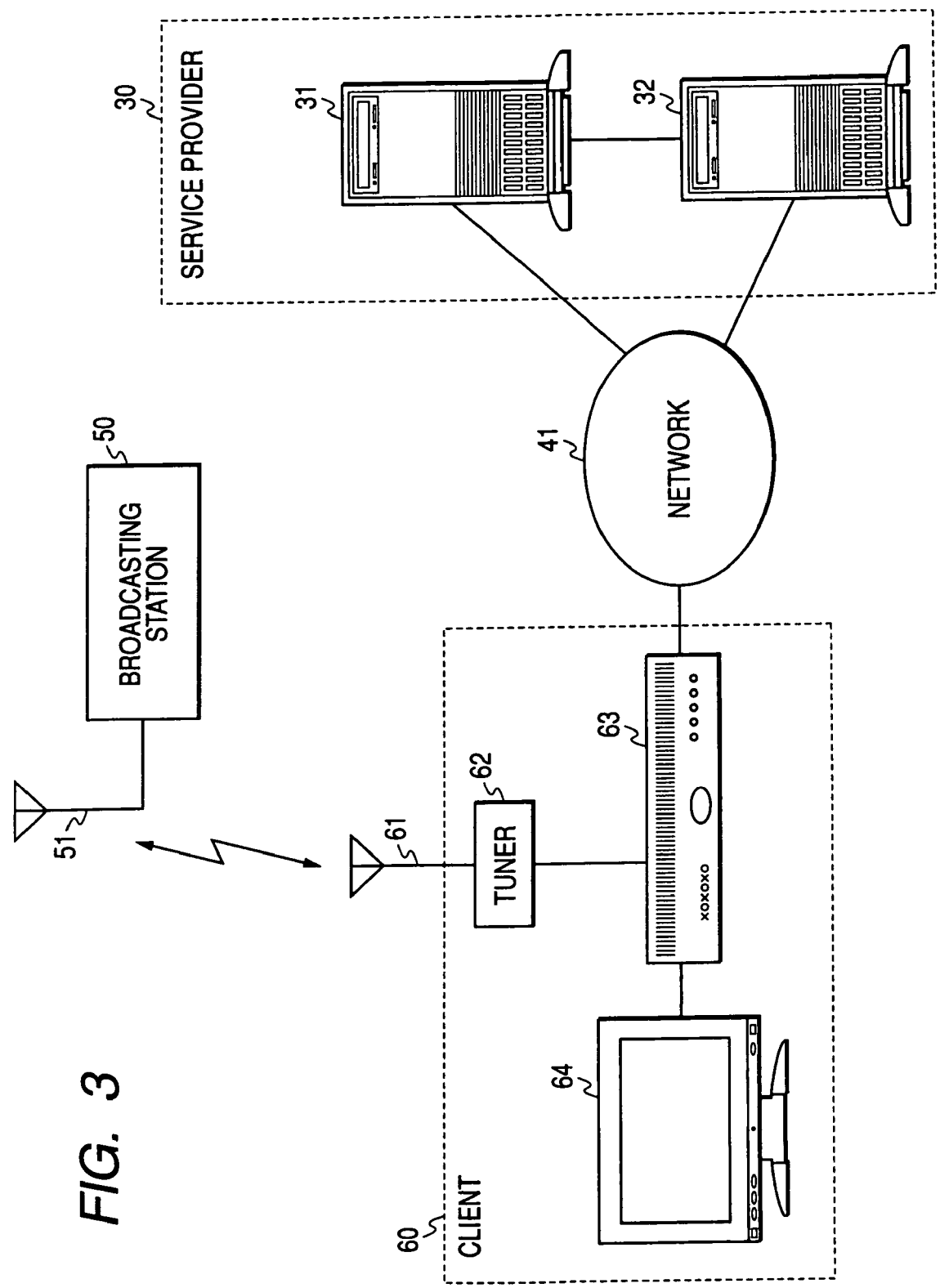
FIG. 3 is a diagram showing an example of a configuration of an EPG providing system to which the invention is applied.

FIG. 3 is a block diagram showing an example of a configuration of an EPG providing system to which the invention is applied.

In FIG. 3, a service provider 30 is a provider that provides a service for delivering an EPG, which is a guide of programs to be broadcasted by a broadcasting station 50 separate from the service provider 30, to a client 60 through a network 41. The service provider 30 includes an EPG server 31 that creates and delivers a general EPG and an editing server 32 that edits the general EPG (for a high resolution monitor) delivered by the EPG server 31 and creates an optimum EPG and delivers the EPG to a hard disk recorder 63 that is a specific terminal included in the client 60.

The EPG server 31 and the editing server 32 are connected to the network 41 represented by the Internet and are capable of communicating with each other. The editing server 32 is also capable of communicating with a hard disk recorder 63, which is also connected to the network 41, and supplies an edited EPG on the basis of a request of the hard disk recorder 63.

Figure 1:
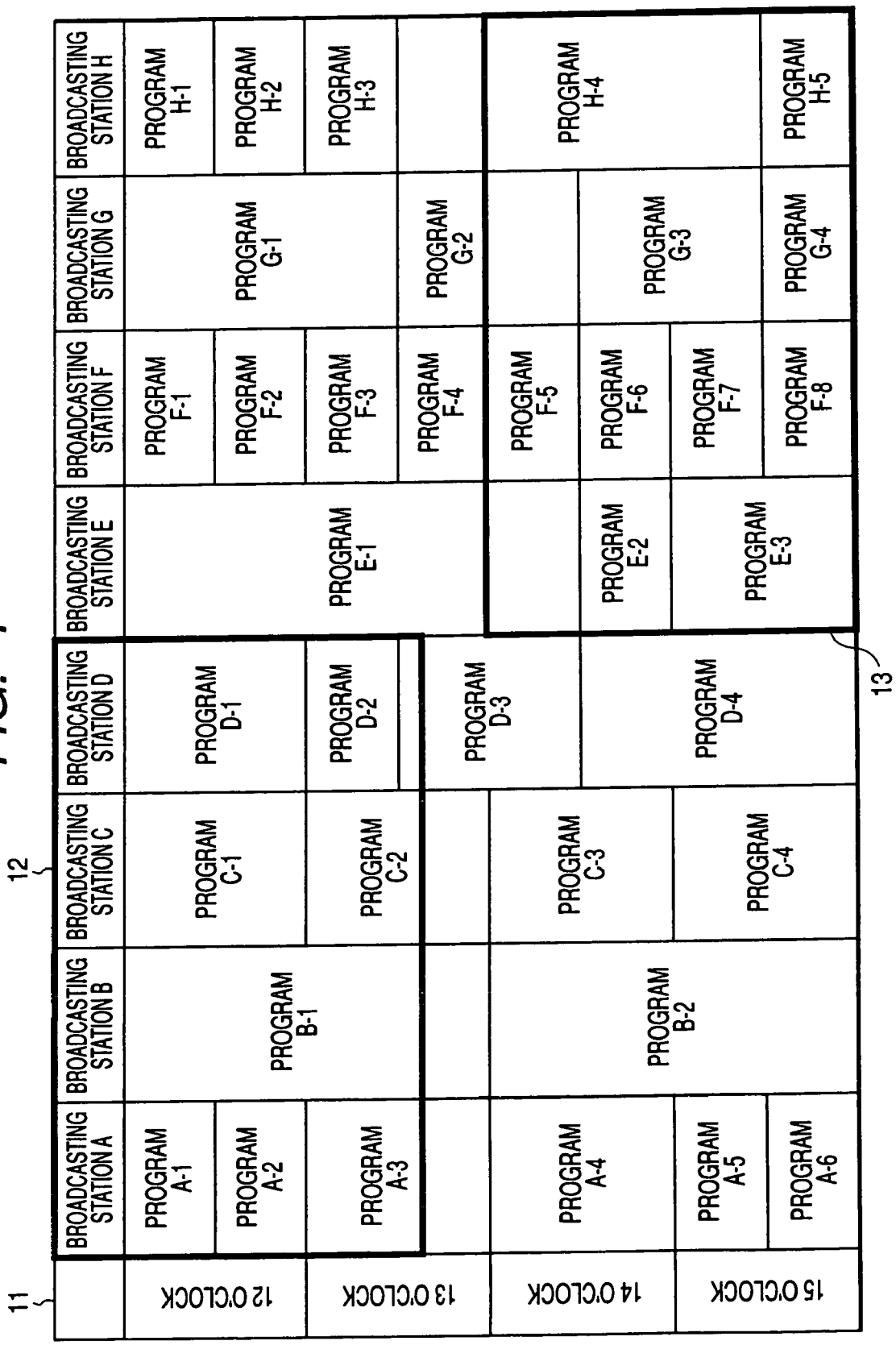
FIG. 1 is a diagram showing an example of a conventional EPG.
Figure 2:
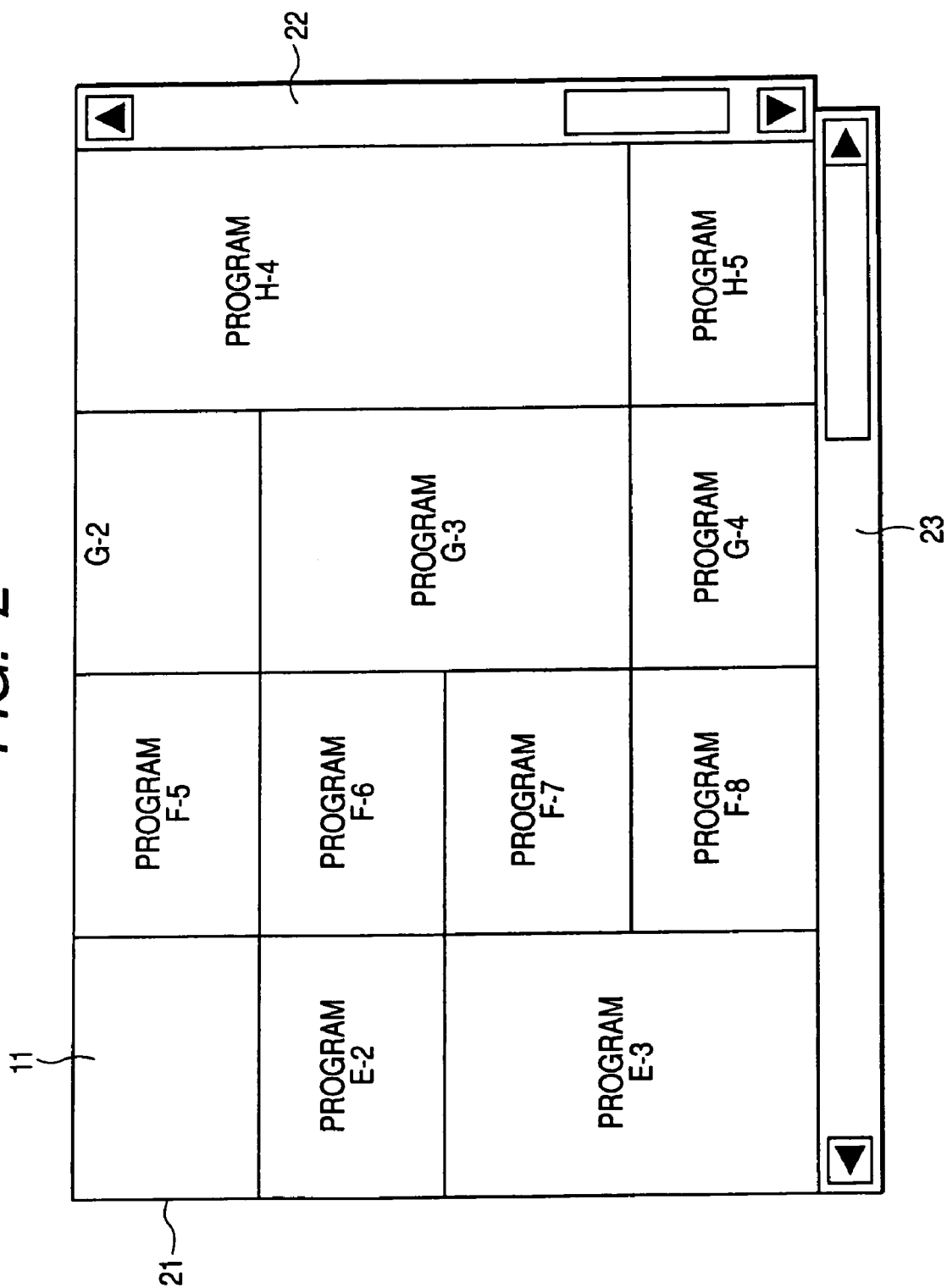
FIG. 2 is a diagram showing an example of display of the EPG in FIG. 1.

Note that the EPG server 31 is connected to the editing server 32 and may supply an EPG to the editing server 32 without the intervention of the network 41. In that case, EPG information provided to the editing server 32 by the EPG server 31 may be constituted only by data at least necessary for a program rather than a WEB page shown in FIG. 1.

The broadcasting station 50 transmits a broadcast content via an antenna 51. Information on the broadcast content such as a broadcast program is laid open to the public in advance and notified to the service provider 30 and the like as well. A method of notifying the information may be any method. For example, the method may be a method with which the service provider 30 acquires information laid open to the public by the broadcasting station 50 through newspapers, magazines, and the like or a method with which the broadcasting station 50 directly notifies the service provider 30 of information through, for example, a not-shown facsimile, the network 41, or the like.

The broadcasting station 50 transmits (broadcasts) a broadcast content, which is scheduled to be transmitted, on the basis of the program notified to the service provider 30 in advance. The broadcast content is transmitted as, for example, a 525$i$ signal or the like of an NTSC (National Television Standards Committee) system. Note that, in FIG. 3, one station, the broadcasting station 50, is shown as a broadcasting station. However, actually, plural broadcasting stations are present and the broadcasting stations transmits (broadcasts) broadcast contents at different frequencies, respectively. The broadcast content may be an HDTV (High Definition Television) signal other than an SDTV (Standard Definition TeleVision) signal.

A tuner 62 of the client 60 is controlled by the hard disk recorder 63 or the like to select a channel to receive and receive a radio wave (a broadcast content), which is transmitted to the client 60 by the broadcasting station 50 through a not-shown satellite or through a ground antenna, through an antenna 61. The tuner 62 supplies the received broadcast content to the hard disk recorder 63.

The hard disk recorder 63 records the broadcast content supplied from the tuner 62 in a built-in hard disk (not shown) or supplies the broadcast content to a monitor 64 on the basis of an instruction from a user input via a not-shown remote controller or the like. In addition, the hard disk recorder 63 supplies a broadcast content, which was acquired in the past and recorded in the built-in hard disk, to the monitor 64 on the basis of an instruction from a user input via the not-shown remote controller or the like.

As described above, the hard disk recorder 63 is also connected to the network 41 and is capable of communicating with the editing server 32. The hard disk recorder 63 is, for example, operated by the user to acquire an EPG supplied by the editing server 32. The hard disk recorder 63 uses a dedicated WEB browser function to cause the monitor 64 to display the EPG that is acquired from the editing server 32 and edited.

The monitor 64, which includes a display such as a CRT (Cathode Ray Tube), an LCD (Liquid Crystal Display), or a PDP (Plasma Display Panel), displays an image corresponding to a video signal, which is included in the broadcast content supplied from the hard disk recorder 64, on the display. The display of the monitor 64 is adapted to an SD signal of the NTSC system or the like. The display displays an image having 525 scanning lines and an aspect ratio of 3:4. Note that, other than the image described above, naturally, resolution of the display of the monitor 64 may be adapted to an HD signal for display of an image having 1125 scanning lines and an aspect ratio of 9:16. However, as described later, the advantage of the invention is larger when resolution of the display is limited to be small. The monitor 64 includes a not-shown speaker and outputs an audio signal included in a broadcast content from the speaker.

Figure 4:
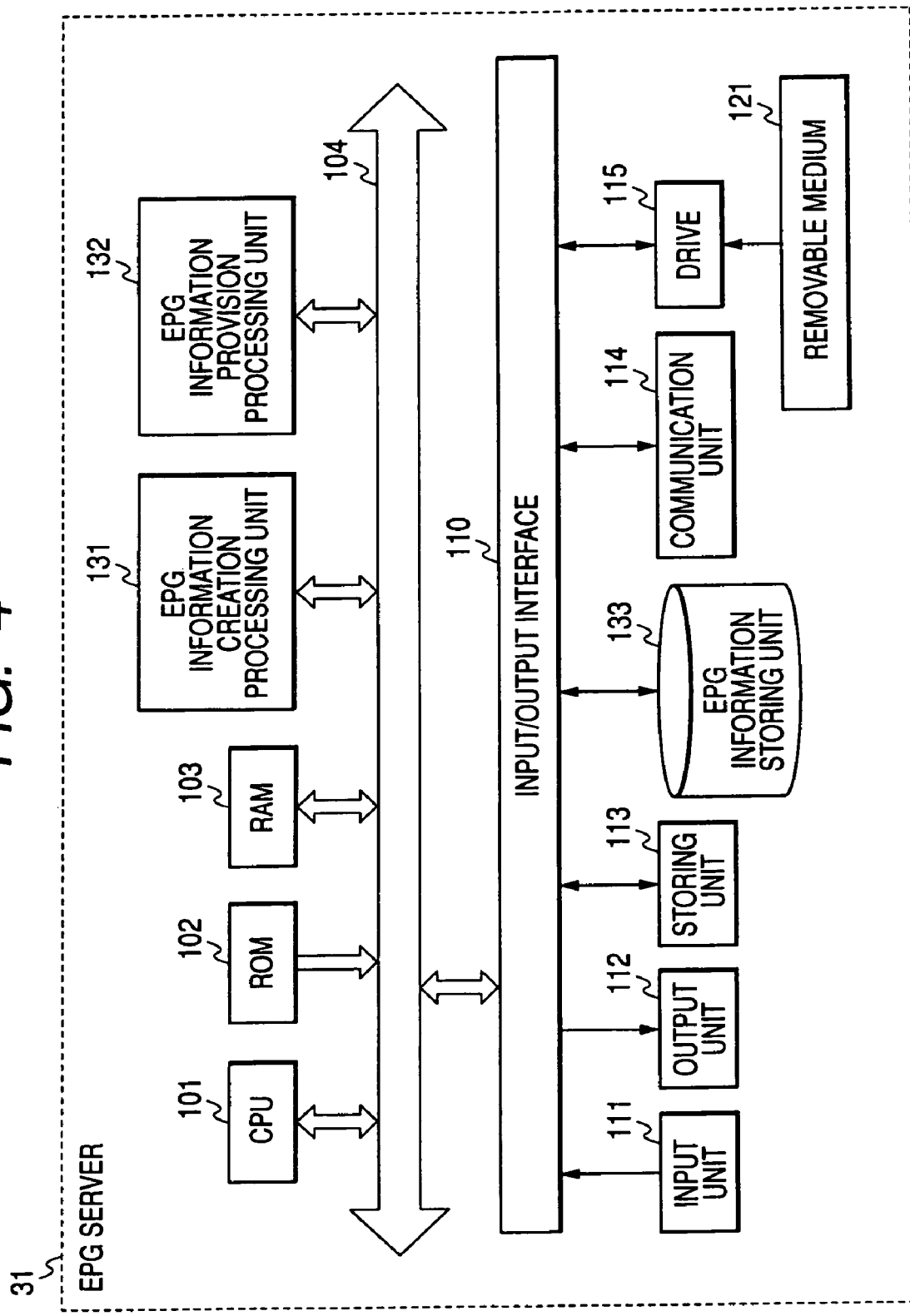
FIG. 4 is a block diagram showing an example of a detailed structure of an EPG server in FIG. 3.

FIG. 4 is a block diagram showing an example of a detailed structure of the EPG server 31 in FIG. 3.

In FIG. 4, a CPU (Central Processing Unit) 101 of the EPG server 31 controls respective units of the EPG server 31 in accordance with programs stored in a ROM (Read Only Memory) 102 to execute various kinds of processing. Data, programs, and the like necessary for the CPU 101 to execute the various kinds of processing are stored in a RAM (Random Access Memory) 103 according to circumstances.

The CPU 101, the ROM 102, and the RAM 103 are connected to one another through a bus 104. In addition, an EPG information creation processing unit 131 and an EPG information provision processing unit 132 are connected to this bus 104.

The EPG information creation processing unit 131 creates EPG information to be laid open to the public, which is described in the HTML or the like, on the basis of information supplied from an input unit 111 or the like, supplies the EPG information to an EPG information storing unit 133 described later, and causes the EPG information storing unit 133 to store the EPG information. The EPG information provision processing unit 132 controls the respective units to perform processing for providing the EPG information, which is created in the EPG information creation processing unit 131 and stored in the EPG information storing unit 133, to the outside of the EPG server 31.

An input/output interface 110 is also connected to the bus 104.

An input unit ill constituted by a keyboard or a mouse is connected to the input/output interface 110. The input/output interface 110 outputs a control signal input to the input unit 111 to the CPU 101 and supplies information on a broadcast schedule of an input program and the like to the EPG information creation processing unit 131 and the like through the CPU 101. An output unit 112 constituted by a display or a speaker is also connected to the input/output interface 110.

Moreover, a storing unit 113, which is constituted by a hard disk, and a communication unit 114, which performs data communication with other apparatuses through the network 41 such as the Internet, are also connected to the input/output interface 110. A drive 115 is used in reading out data from a removable medium 121 constituted by a recording medium such as a magnetic disk, an optical disk, a magneto-optical disk, or a semiconductor memory and in writing data in the removable medium 121.

The EPG information storing unit 133 having a storage element such as a hard disk, a magnetic disk, an optical disk, a magneto-optical disk, or a semiconductor memory is also connected to the input/output interface 110. The EPG information storing unit 133 stores EPG information created in the EPG information creation processing unit 131 and supplied to the EPG information storing unit 133 via the bus 104. The EPG information storing unit 133 searches for EPG information, which is requested by the EPG information provision processing unit 132, in the stored EPG information. When the requested EPG information is present, the EPG information storing unit 133 supplies the EPG information to the EPG information provision processing unit 132.

Figure 5:
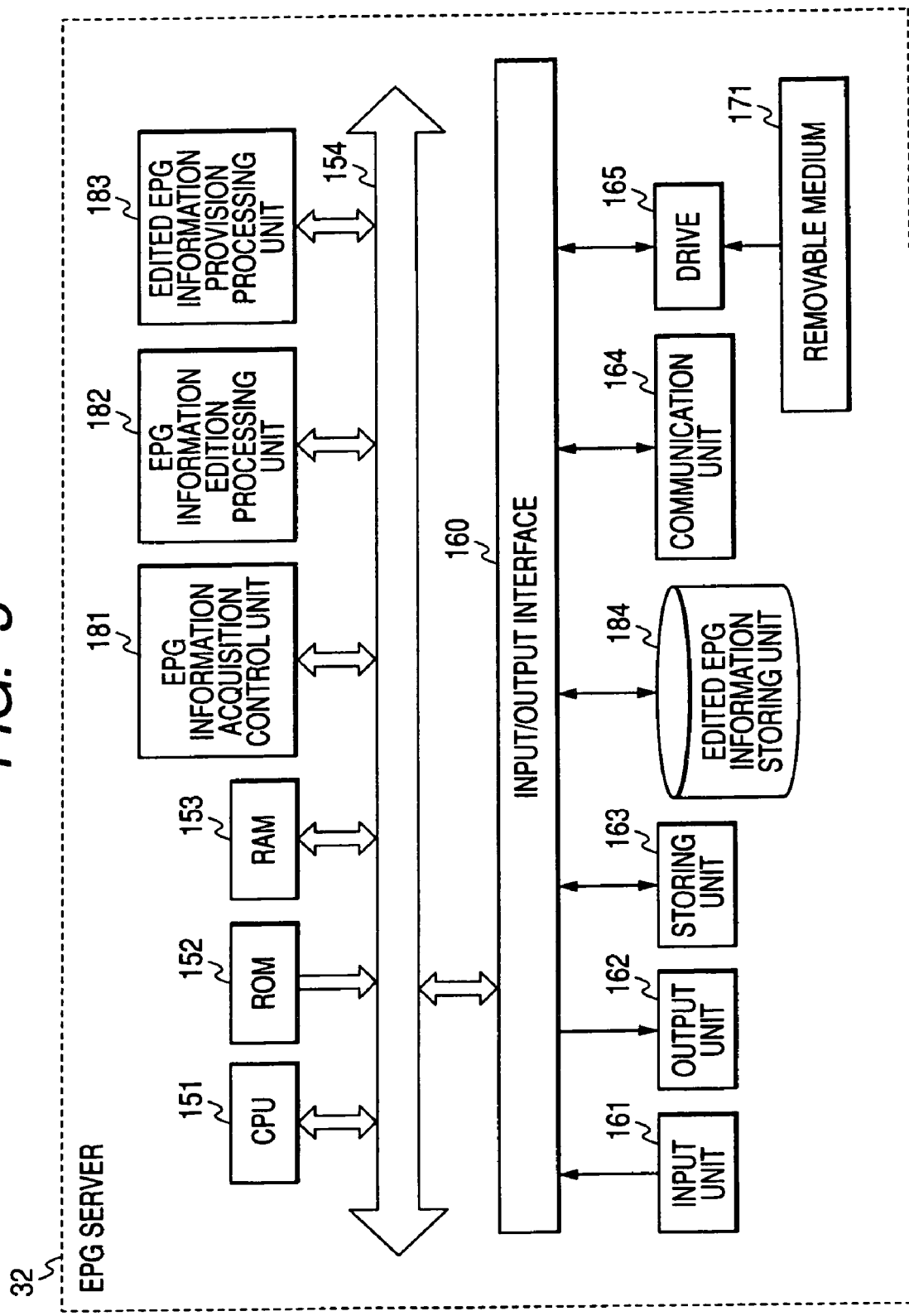
FIG. 5 is a block diagram showing an example of a detailed structure of an editing server in FIG. 3.

FIG. 5 is a diagram showing an example of a detailed structure of the editing server 32 in FIG. 3.

In FIG. 5, a CPU 151 of the editing server 32 controls respective units of the editing server 32 in accordance with programs stored in a ROM 152 to execute various kinds of processing. Data, programs, and the like necessary for the CPU 151 to execute the various kinds of processing are stored in a RAM 153 according to circumstances.

The CPU 151, the ROM 152, and the RAM 153 are connected to one another via a bus 154. An EPG information acquisition control unit 181, an EPG information edit processing unit 182, and an edited EPG information provision processing unit 183 are connected to this bus 154.

The EPG information acquisition control unit 181 controls a communication unit 164 described later to perform processing for acquiring EPG information from the EPG server 31. The EPG information acquisition control unit 181 supplies the acquired EPG information to the EPG information edit processing unit 182.

The EPG information edit processing unit 182 edits the EPG information supplied from the EPG information acquisition control unit 181 again and, as described later, generates edited EPG information that is EPG information edited for a predetermined WEB browser for displaying EPG information on a low resolution display. The EPG information edit processing unit 182 supplies the generated edited EPG information to an edited EPG information storing unit 184 described later through the bus 154 and causes the edited EPG information storing unit 184 to store the edited EPG information.

The edited EPG information provision processing unit 183 controls the communication unit 164 to perform processing for providing the edited EPG information, which is edited by the EPG information edit processing unit 182 and stored in the edited EPG information storing unit 184, to the outside of the editing server 32 (laying open the edited EPG information to the public). On the basis of a request acquired through the communication unit 164 or the like, the edited EPG information provision processing unit 183 acquires requested edited EPG information from the edited EPG information storing unit 184. The edited EPG information storing unit 184 supplies the acquired edited EPG information to a request source through the communication unit 164.

An input/output interface 160 is also connected to the bus 154.

An input unit 161 including a keyboard and a mouse is connected to the input/output interface 160. The input/output interface 160 outputs a signal, which is input to the input unit 161, to the CPU 151. An output unit 162 including a display and a speaker is also connected to the input/output interface 160.

Moreover, a storing unit 163 including a hard disk and a communication unit 164, which performs data communication with other apparatuses through the network 41 such as the Internet, are also connected to the input/output interface 160. A drive 165 is used in reading out data from a removable medium 171 including a recording medium such as a magnetic disk, an optical disk, a magneto-optical disk, or a semiconductor memory and in writing data in the removable medium 171.

The edited EPG information storing unit 184 having a storage element such as a hard disk, a magnetic disk, an optical disk, a magneto-optical disk, or a semiconductor memory is connected to the input/output interface 160. The edited EPG information storing unit 184 stores edited EPG information that is edited in the EPG information edit processing unit 182 and supplied to the edited EPG information storing unit 184 through the bus 154. The edited EPG information storing unit 184 searches for edited EPG information, which is requested by the edited EPG information provision processing unit 183, in the stored EPG information. When the edited EPG information requested is present, the EPG information storing unit 133 supplies the requested edited EPG information to the edited EPG information provision processing unit 183.

Figure 6:
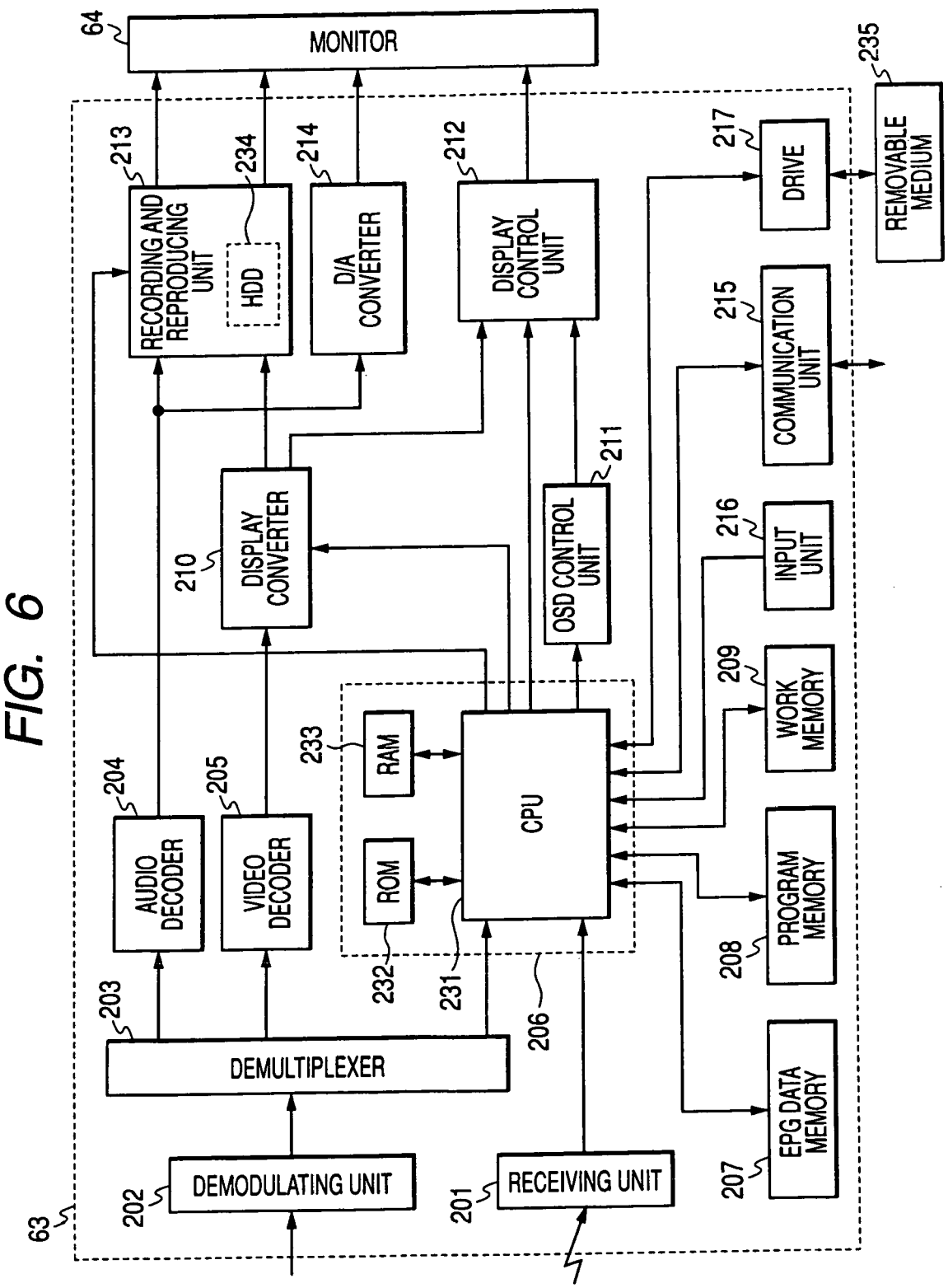
FIG. 6 is a block diagram showing an example of a detailed structure of a hard disk recorder in FIG. 3.

FIG. 6 is a diagram showing an example of a detailed structure of the hard disk recorder 63 in FIG. 3.

In FIG. 6, a receiving unit 201 receives an infrared ray signal from the not-shown remote controller, converts the infrared ray signal into an electric signal, and outputs the electric signal to a recorder control unit 206. The recorder control unit 206 includes a CPU 231, a ROM 232, and a RAM 233. The CPU 231 loads programs and data, which are stored in the ROM 232, a program memory 208, or a work memory 209 in advance, to the RAM 233 to execute various kinds of processing to thereby control respective units of the hard disk recorder 63.

Data and the like necessary for the CPU 231 to execute various kinds of processing are also stored in the RAM 233 according to circumstances. The recorder control unit 206 controls a communication unit 215 to output a tuning control signal to the tuner 62.

A demodulating unit 202 demodulates a signal supplied from the tuner 62 and outputs the signal to a demultiplexer 203. The demultiplexer 203 divides data supplied from the demodulating unit 202 into audio data, video data, and other data and outputs the data to an audio decoder 204, a video decoder 205, and a CPU 231 of a recorder control unit 206, respectively.

The audio decoder 204 decodes the input audio data in, for example, the MPEG (Moving Picture Experts Group) system and outputs the audio data to a recording and reproducing unit 213. The video decoder 205 decodes the input video data in, for example, the MPEG system and outputs the video data to the display converter 210. The CPU 231 of the recorder control unit 206 controls the respective units and supplies character information and the like to an OSD (On Screen Display) control unit 211 on the basis of input information.

A display converter 210 encodes the video data supplied from the video decoder 205 into video data of, for example, the NTSC system, and outputs the video data to the recording and reproducing unit 213. At the same time, the display converter 210 converts a size of a screen of the video data supplied from the video decoder 205 into a size corresponding to the size of the monitor 64 and converts the video data into video data of the NTSC system. Thereafter, the display converter 210 converts the video data into an analog signal and outputs the analog signal to a display control unit 212.

Under the control of the recorder control unit 206, the display control unit 212 superimposes an OSD signal output by the OSD control unit 211 on a video signal input from the display converter 210, outputs the OSD signal superimposed on the video signal to the display of the monitor 64, and causes the display to display the OSD signal superimposed on the video signal.

The audio data output by the audio decoder 204 is converted into an analog signal by a D/A converter 214 and supplied to the monitor 64. The monitor 64 outputs this audio signal from a built-in speaker.

The recording and reproducing unit 213 incorporates a hard disk (HDD) 234 and encodes audio data and video data in, for example, the MPEG system and, then, combines the audio data and the video data, and applies channel coding to the combined audio data and video data. Thereafter, the recording and reproducing unit 213 records the combined audio data and video data in the hard disk 234.

The recording and reproducing unit 213 reproduces data recorded in the hard disk 234 and divides the data into audio data and video data. The recording and reproducing unit 213 decodes the audio data in the MPEG system, subjects the audio data to D/A conversion, and outputs the audio data to the speaker of the monitor 64. At the same time, the recording and reproducing unit 213 decodes the video data in the MPEG system, subjects the video data to D/A conversion, and outputs the video data to the display of the monitor 64.

An EPG data memory 207 includes a storage area constituted by a storage element such as a hard disk and a semiconductor memory and stores edited EPG information supplied to the CPU 231. The EPG data memory 207 retrieves edited EPG information including an EPG requested by the CPU 231 and supplies the edited EPG information to the CPU 231.

A communication unit 215 is controlled by the CPU 231 to perform communication with the editing server 32 through the network 41, supply a request for edited EPG information supplied from the CPU 231 to the editing server 32, acquire edited information that is supplied from the editing server 32 on the basis of the request, and supply the edited information to the CPU 231.

An input unit 216 is constituted by an input device such as a group of operation buttons, a touch panel, a keyboard, or a mouse that receives various kinds of operation from a user. Like the not-shown remote controller, the input unit 216 receives an instruction from the user and supplies the instruction to the CPU 231 of the recorder control unit 206.

A drive 217 is controlled by the CPU 231 to read out computer programs and data stored in a removable medium 235 such as a magnetic disk, an optical disk, a magneto-optical disk, or a semiconductor memory, which is inserted according to circumstances, and supply the computer programs and data to the CPU 231. The CPU 231 loads the read-out computer programs and data to the RAM 233 or stores the computer programs and the data in the program memory 208 or the work memory 209 as required.

Figure 7:
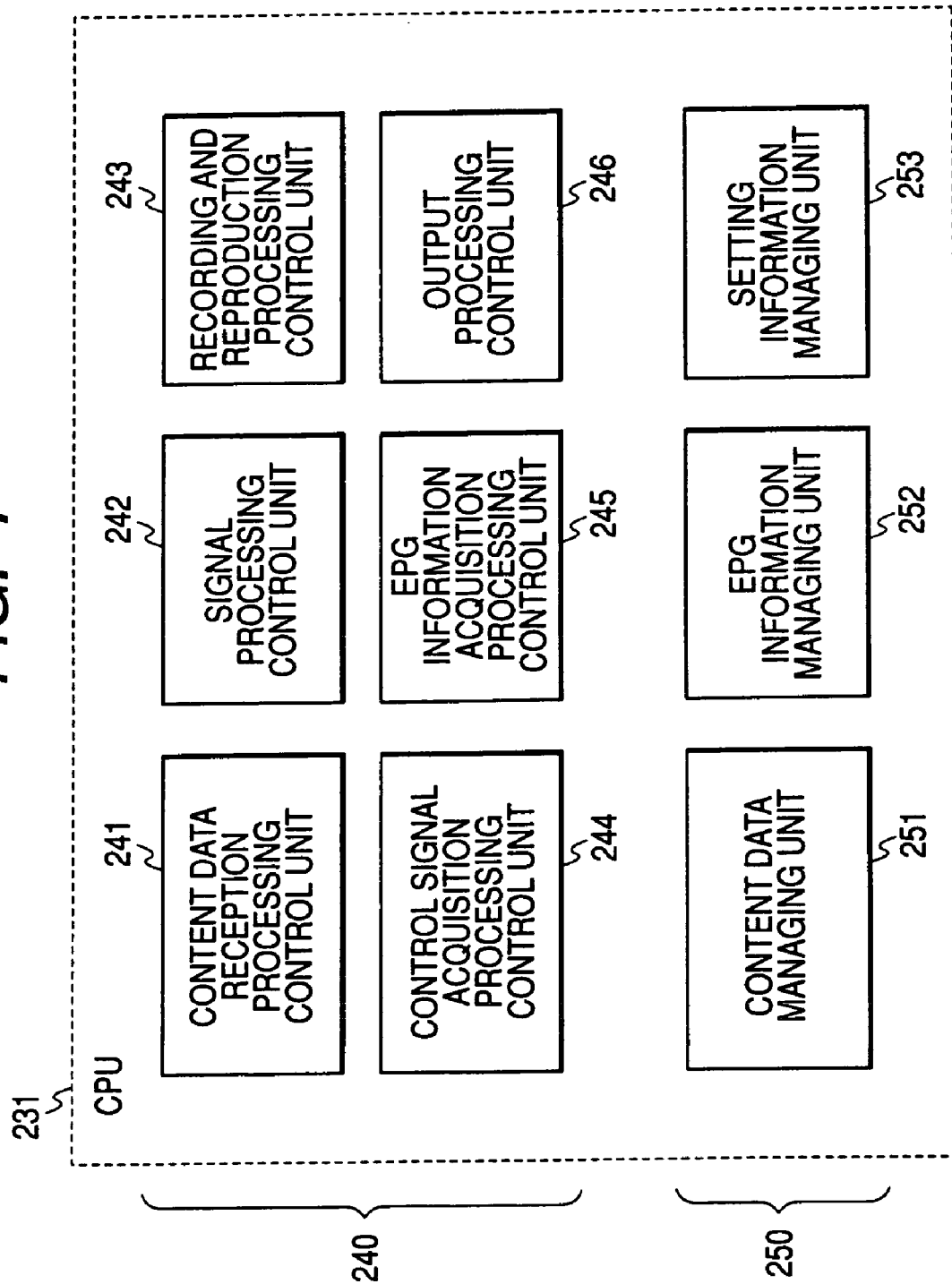
FIG. 7 is a block diagram showing functions included in a CPU in FIG. 6.

FIG. 7 is a functional block diagram showing an example of functions included in the CPU 231 in FIG. 6.

In FIG. 7, the CPU 231 includes a control unit 240 that controls respective units and a managing unit 250 that manages information.

The CPU 231 has a content data reception processing control unit 241, a signal processing control unit 242, a recording and reproduction processing control unit 243, a control signal acquisition processing control unit 244, an EPG information acquisition processing control unit 245, and an output control unit 246 as the control unit 240.

The content data reception processing control unit 241 controls the demodulating unit 202, the demultiplexer 203, or the like to execute processing for reception of a broadcast content (content data).

The signal processing control unit 242 controls the audio decoder 204, the video decoder 205, or the like and applies signal processing to a received image signal or audio signal.

The recording and reproduction processing control unit 243 controls the display converter 210, the recording and reproducing unit 213, or the like to execute processing for recording an image signal or an audio signal in the hard disk (HDD) 234 and reproducing an image signal or an audio signal recorded in the hard disk (HDD) 234.

The control signal acquisition processing control unit 244 controls the receiving unit 201, the program memory 208, the work memory 209, the communication unit 215, the input unit 216, or the like and performs processing for acquisition of a control signal.

The EPG information acquisition processing control unit 245 controls the EPG data memory 207, the communication unit 215, or the like to execute processing for acquisition of EPG information.

The output processing control unit 246 controls the display converter 210, the OSD control unit 211, the display control unit 212, the D/A converter 214, or the like to execute processing for output of an image signal or an audio signal to the monitor 64.

The CPU 231 has a content data managing unit 251 that manages content data (broadcast contents) stored in the hard disk (HDD) 234 and the like, an EPG information managing unit 252 that manages EPG information stored in the EPG data memory 207, and a setting information managing unit 253 that manages setting information stored in the work memory 209 and the like as the managing unit 250.

The CPU 231 uses these units to control operations and the like of the entire hard disk recorder 63 and manage information such as programs and data.

Referring back to FIG. 3, operations of the EPG providing system will be explained.

The broadcasting station 50 lays open information on programs including a future broadcast schedule of programs, broadcast contents, performers, or the like to the outside of the broadcasting station 50 and provides the information to the service provider 30.

A user of the EPG server 31 of the service provider 30 causes the EPG server 31 to start processing for inputting information on a laid-open program by, for example, operating the input unit 111. The CPU 101 of the EPG server 31 controls the EPG information creation processing unit 131 on the basis of an input instruction of the user to start EPG information creation processing and create general EPG information, which is information on a broadcast content, suitable for a high resolution monitor like the EPG 11 shown in FIG. 1.

Figure 8:
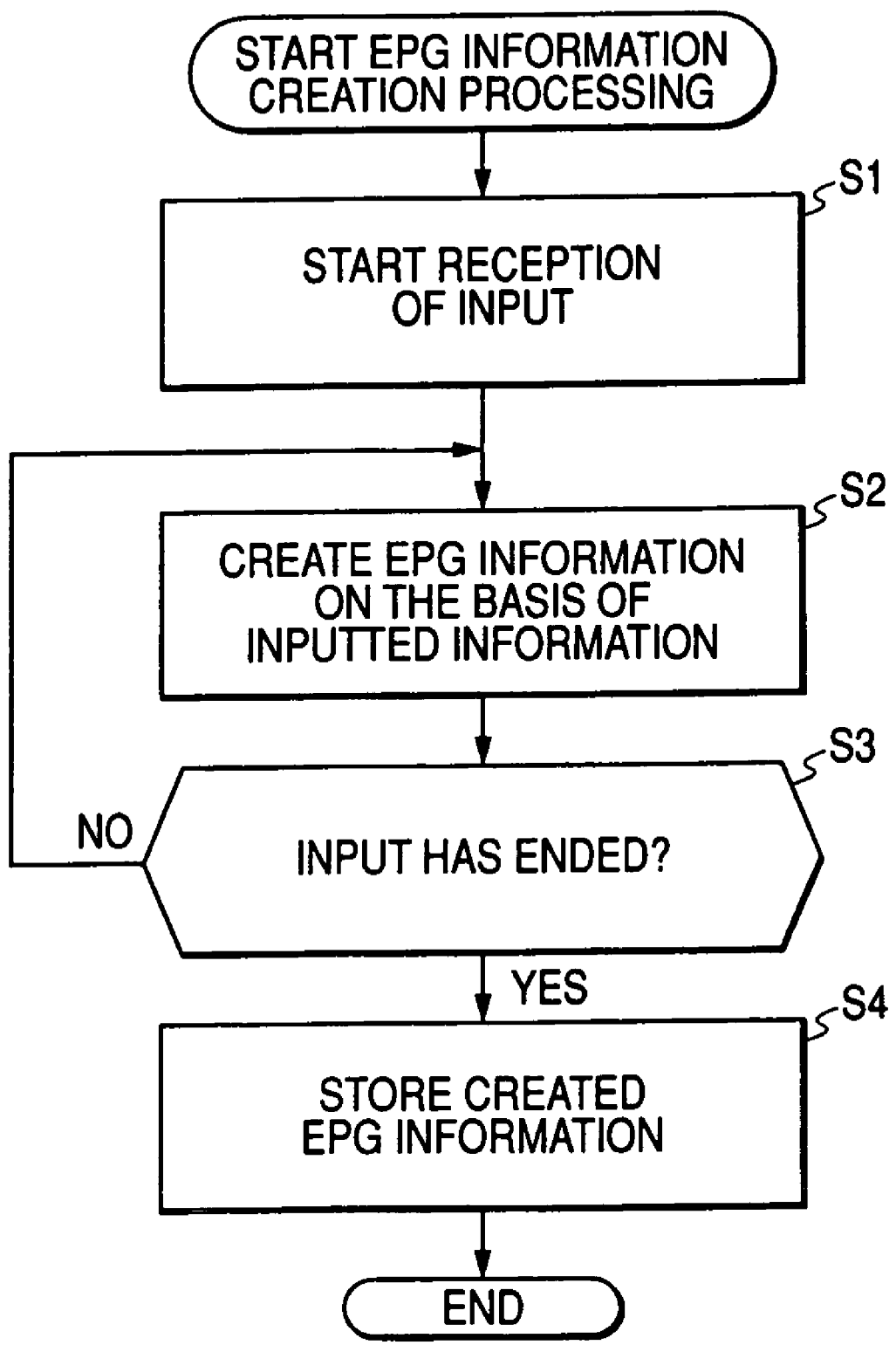
FIG. 8 is a flowchart for explaining EPG information creation processing by the EPG server in FIG. 3.

The EPG information creation processing by the EPG information creation processing unit 131 will be explained with reference to a flowchart of FIG. 8.

First, in step S1, the EPG information creation processing unit 131 controls the input unit 111 through the bus 104 and starts reception of an input from a user.

When the reception of an input is started, in step S2, the EPG information creation processing unit 131 creates EPG information (the EPG 11 in FIG. 1), which is information on a broadcast content and is a WEB page described in the HTML, on the basis of information input by operation of the input unit 111 by the user.

In step S3, the EPG information creation processing unit 131 judges whether the input from the user has ended. If it is judged that the input from the user has not ended, the EPG information creation processing unit 131 returns the processing to step S2 and repeats the processing in the subsequent steps.

If it is judged in step S3 that the input from the user has ended, the EPG information creation processing unit 131 advances the processing to step S4, supplies created EPG information for high resolution to the EPG information storing unit 133, and causes the EPG information storing unit 133 to store the EPG information. When the processing in step S4 ends, the EPG information creation processing unit 131 ends the EPG information creation processing.

The EPG information (the EPG 11 in FIG. 1) stored in the EPG information storing unit 133 is provided to the outside of the EPG server 31 (laid open to the public) by the EPG information provision processing unit 132.

Referring back to FIG. 3, the editing server 32 executes EPG information acquisition processing periodically at predetermined intervals, for example, requests EPG information of one week ahead once a day. The editing server 32 requests a laid-open version of the EPG information from the EPG server 31. Note that, other than being performed periodically, this request may be executed when, for example, a user of the editing server 32 instructs the request.

Figure 9:
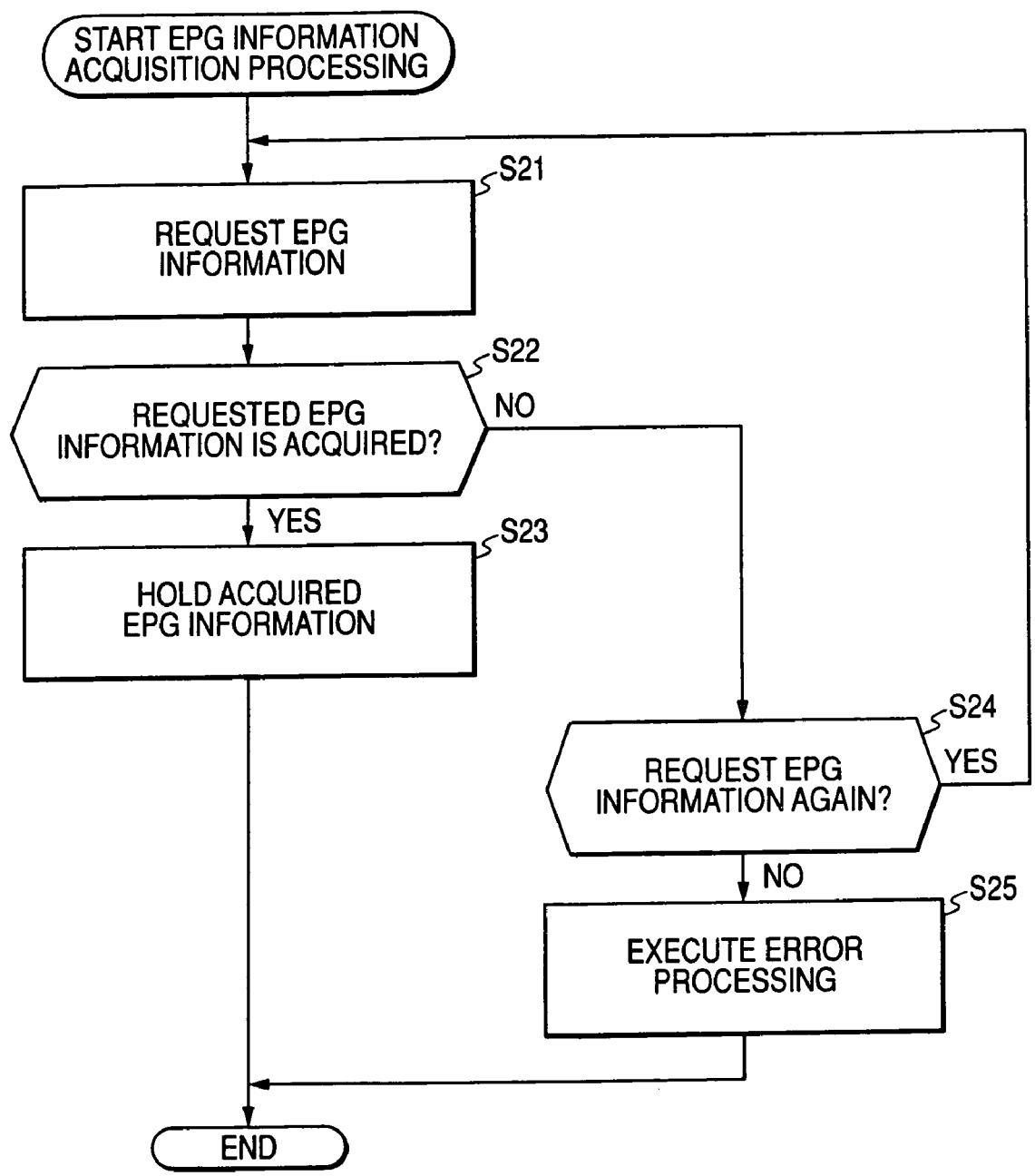
FIG. 9 is a flowchart for explaining EPG information acquisition processing by the editing server in FIG. 3.

EPG information acquisition processing by the EPG information acquisition control unit 181 will be explained with reference to a flowchart of FIG. 9.

First, in step S21, the EPG acquisition control unit 181 of the editing server 32 controls the communication unit 164 to request EPG information from the EPG server 31. As described later, the EPG information provision processing unit 132 of the EPG server 31 searches for the requested EPG information in EPG information stored in the EPG information storing unit 133. When the requested EPG information is present, the EPG information provision processing unit 132 supplies the EPG information (the EPG 11 in FIG. 1) to the editing server 32. When the requested EPG information is not present, the EPG information provision processing unit 132 returns an error response to the EPG acquisition control unit 181.

In step S22, the EPG information acquisition control unit 181, which has requested the EPG information, controls the communication unit 164 to judge whether the requested EPG information has been acquired. If it is judged that the requested EPG information has been acquired, the EPG information acquisition control unit 181 advances the processing to step S23, holds the acquired information in the RAM 153 or a not-shown RAM or the like incorporated in the EPG information acquisition control unit 181, and ends the EPG information acquisition processing.

If it is judged in step S22 that the requested EPG information has not been acquired because, for example, the error response is acquired from the EPG server 31, in step S24, the EPG information acquisition control unit 181 judges whether the same EPG information should be requested again.

When it is judged, on the basis of setting or the like decided in advance, that the same EPG information should be requested again, the EPG information acquisition control unit 181 returns the processing to step S21 and repeats the processing in the subsequent steps. If it is judged that the EPG information should not be requested again, the EPG information acquisition control unit 181 advances the processing to step S25 and executes error processing. For example, the EPG information acquisition control unit 181 controls the output unit 162 to display an error message on the display or controls the storing unit 163 to record an error log. When the processing in step S25 ends, the EPG information acquisition control unit 181 ends the EPG information acquisition processing.

Referring back to FIG. 3, in response to the EPG information acquisition processing by the editing server 32, as described above, the EPG server 31 performs the EPG information provision processing. When the EPG server 31 receives a request for EPG information supplied from the editing server 32, the EPG server 31 starts the EPG information provision processing.

Figure 10:
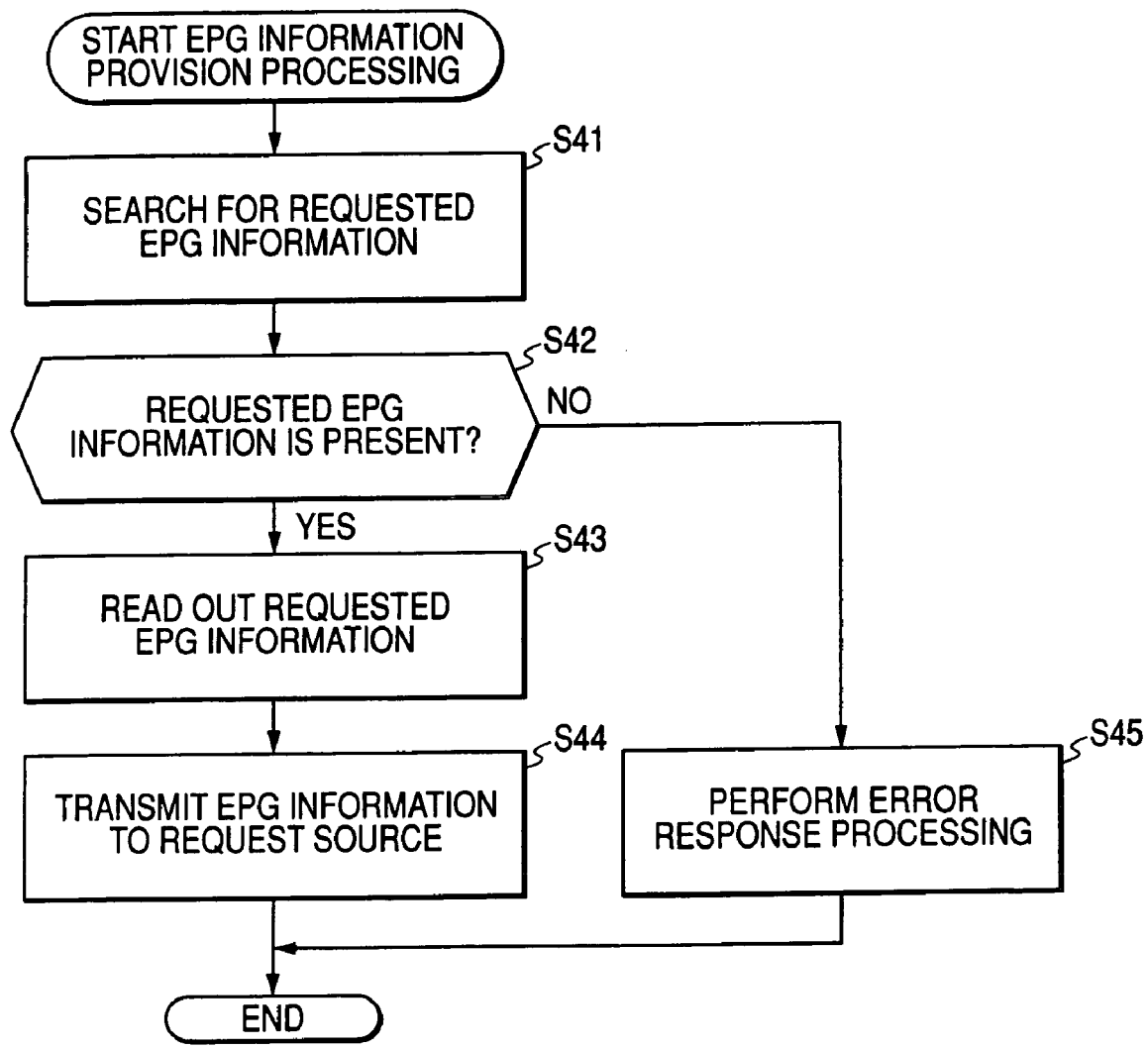
FIG. 10 is a flowchart for explaining EPG information provision processing by the EPG server in FIG. 3.

The EPG information provision processing by the EPG information provision processing unit 132 will be explained with reference to a flowchart of FIG. 10.

In step S41, the EPG information provision processing unit 132, which has acquired a request for EPG information through the communication unit 114, controls the EPG information storing unit 133 on the basis of the request to search for the requested EPG information in EPG information stored in the EPG information storing unit 133. The EPG information storing unit 133 performs search processing for the EPG information and supplies a search result to the EPG information provision processing unit 132.

In step S42, the EPG information provision processing unit 132 judges whether the requested EPG information is present on the basis of the search result supplied from the EPG information storing unit 133.

If the requested EPG information is stored in the EPG information storing unit 133 and it is judged that the EPG information is present, the EPG information provision processing unit 132 advances the processing to step S43, reads out the requested EPG information from the EPG information storing unit 133, and acquires the EPG information.

In step S44, the EPG information provision processing unit 132, which has read out and acquired the requested EPG information, controls the communication unit 114 to transmit the acquired EPG information to the editing server 32, which is the request source, and ends the EPG information provision processing.

If the requested EPG information is not stored in the EPG information storing unit 133 and it is judged in step S42 that the EPG information is not present, the EPG information provision processing unit 132 advances the processing to step S45, performs error response processing, for example, transmits an error message to the editing server 32, and ends the EPG information provision processing.

When the editing server 32 has acquired the EPG information (the EPG 11 in FIG. 1) from the EPG server 31 as described above, the CPU 151 of the editing server 32 controls the EPG information edit processing unit 182 to start EPG information edit processing and edit the EPG information acquired from the EPG server 31 such that EPG information dedicated for the hard disk recorder 63 (corresponding to an optimum image when the EPG information is displayed on the monitor 64) is obtained.

Figure 11:
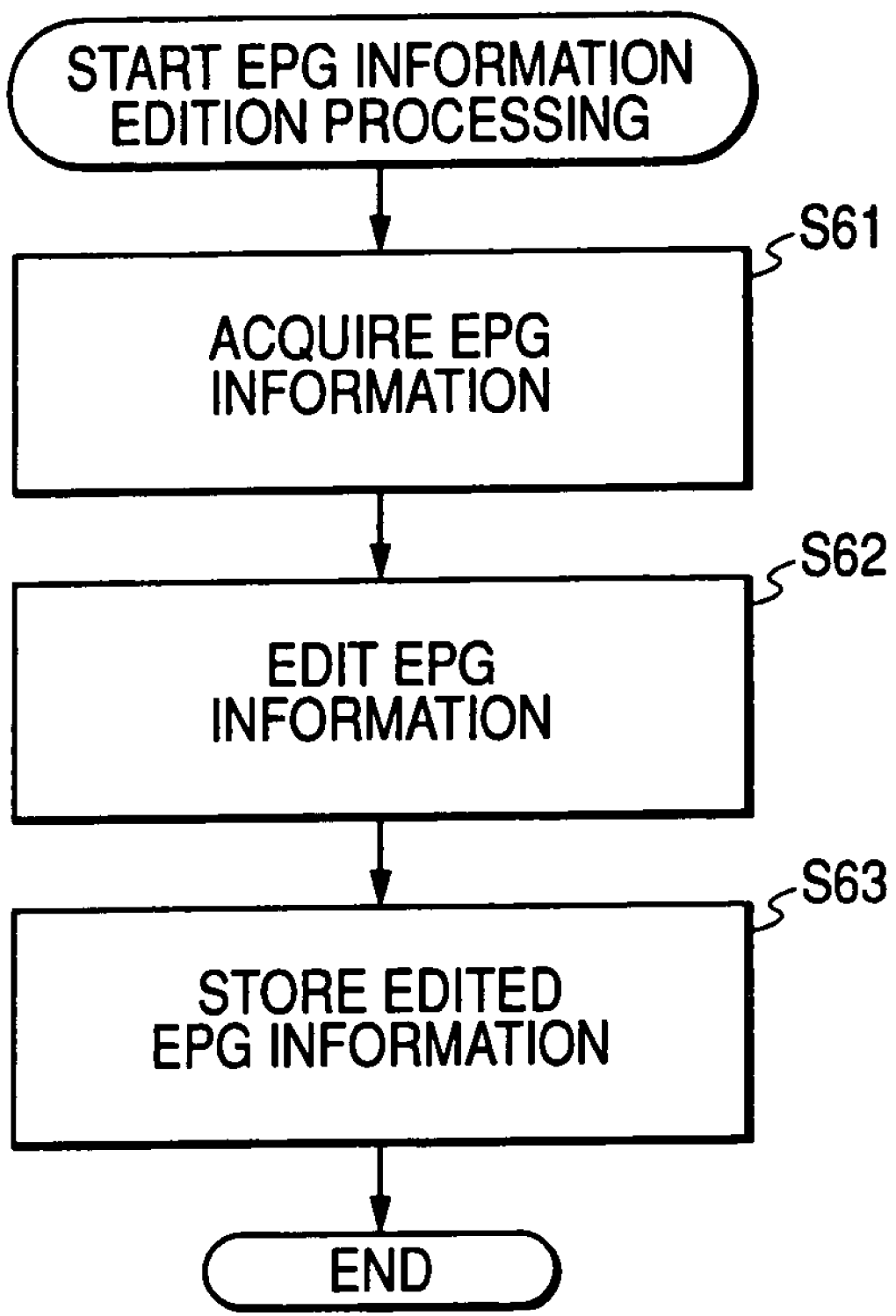
FIG. 11 is a flowchart for explaining EPG information editing processing by the editing server in FIG. 3.

The EPG information edit processing by the EPG information edit processing unit 182 will be explained with reference to a flowchart of FIG. 11.

First, in step S61, the EPG information edit processing unit 182 acquires the EPG information supplied from the EPG server 31, which is held in the not-shown RAM incorporated in the EPG information acquisition control unit 181 or the RAM 153, through the bus 154.

In step S62, the EPG information edit processing unit 182 edits the EPG information such that the EPG information corresponds to an image formed as a new WEB page of a predetermined format. In step S63, the EPG information edit processing unit 182 supplies the edited EPG information to the edited EPG information storing unit 184, causes the edited EPG information storing unit 184 to store the EPG information, and ends the EPG information edit processing.

Figure 12:
FIG. 12 is a diagram showing an example of an edited EPG.

FIG. 12 is a diagram showing an example of a structure of an image (a WEB page) to which the EPG information edited as described above corresponds.

In FIG. 12, an edited EPG 261 is an EPG after editing that is edited in the EPG information edit processing unit 182 and is a program guide for broadcasting stations A to P in a time frame of 16 o'clock to 20 o'clock. The edited EPG 261 is divided into eight areas of the same size, namely, areas 261-1 to 261-8 (areas sectioned by dotted lines 264 to 267). A size of the respective areas is the same as a size of an area 262 indicating an image size displayed on the monitor 64 at a time (a size of a display area of a WEB browser displayed on the monitor 64).

The EPG information edit processing unit 182 edits EPG information to generate an edited EPG 261 in which a program guide for one hour of seven broadcasting stations (broadcasting stations A to G or broadcasting stations H to P) is formed in an image size displayed on the monitor 64 at a time (an image size for one screen) and images for eight screens (a program guide for four hours and fourteen stations) larger than the image size is formed as one image (WEB page).

Therefore, as shown in FIG. 12, structures of images are similar to each other in the respective areas 261-1 to 261-8 and the same information such as time frames and broadcasting station names is displayed in the respective areas. Consequently, for example, even when a position of an area displayed on the monitor 64 of the edited EPG 261 is scrolled from the upper left area 262 to a lower right area 263, an image of a similar structure is displayed on the monitor 64. Thus, important information such as time frames and broadcasting station names is always displayed. Note that details of the structure and the like of an image will be described later.

The edited EPG 261 generated as described above is provided to the outside of the editing server 32 (laid open to the public) by the edited EPG information provision processing unit 183 of the editing server 32.

In short, the editing server 32 acquires EPG information for a high resolution monitor from the EPG server 31, edits the EPG information, and generates and provides EPG information for a low resolution monitor.

Note that, as described above, the editing server 32 provides the edited EPG information including an EPG (program guide) for four hours as one image (WEB page) (lays open the edited EPG information to the public). When the client 30 side requests edited EPG information, the editing server 32 provides edited EPG information including a date and a time frame identical with those in the requested edited EPG information to the request source. In addition, the editing server 32 supplies information other than edited EPG information for displaying various kinds of information on the monitor 64 to the hard disk 63 according to circumstances.

Referring back to FIG. 3, the broadcasting station 50 broadcasts a broadcast content through the antenna 51 on the basis of the broadcast schedule notified to the service provider 30 as described above. The hard disk recorder 63 of the client 60 is operated by a user and controls the turner 62 to receive the broadcast content, which is broadcasted by the broadcasting station 50, through the antenna 61.

Note that the broadcasting station 50 shown in FIG. 3 may be, for example, a broadcasting station that performs a broadcast by cable such as a cable television. In that case, although not shown in the figure, the broadcasting station 50 and the tuner 62 are connected by cable through a network or the like. The tuner 62 acquires a broadcast content broadcasted by the broadcasting station 50 through the network.

In order to learn contents (broadcast schedules) of programs to be broadcasted by respective broadcasting stations such as the broadcasting station 50, the user of the client 60 operates the remote controller (not shown) or the input unit 216 of the hard disk recorder 63 to cause the hard disk recorder 63 to request EPG information from the editing server 32 of the service provider 30 that provides an EPG. On the basis of an instruction of the user, the hard disk recorder 63 requests edited EPG information from the editing server 32 through the network 41. Edited EPG information acquisition processing by the hard disk recorder 63 will be described later.

The editing server 32, which is requested by the hard disk recorder 63 to provide edited EPG information, executes edited EPG information provision processing and provides edited EPG information (the edited EPG 261 in FIG. 12).

Figure 13:
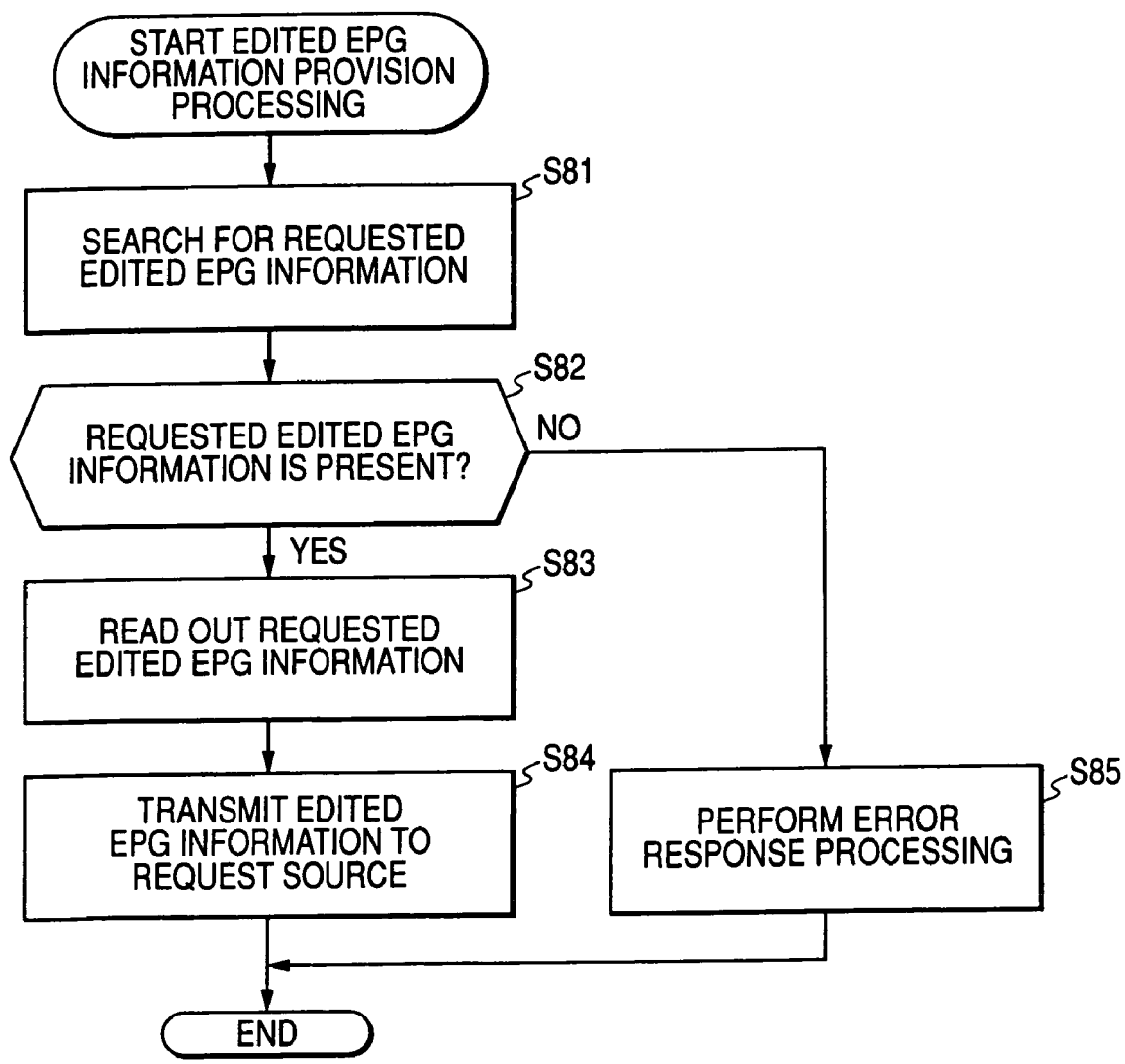
FIG. 13 is a flowchart for explaining edited EPG information provision processing by the editing server in FIG. 3.

The edited EPG information provision processing by the edited EPG information provision processing unit 183 of the editing server 32 will be explained with reference to a flowchart of FIG. 13.

In step S81, the edited EPG information provision processing unit 183, which has acquired a request for edited EPG information through the communication unit 164, controls the edited EPG information storing unit 184 on the basis of the request to search for the requested edited EPG information in edited EPG information stored in the edited EPG information storing unit 184. The edited EPG information storing unit 184 performs search processing for the edited EPG information and supplies a search result to the edited EPG information provision processing unit 183.

In step S82, the edited EPG information provision processing unit 183 judges whether the requested edited EPG information is present on the basis of the search result supplied from the edited EPG information storing unit 184.

If the requested edited EPG information is stored in the edited EPG information storing unit 184 and it is judged that the edited EPG information is present, the edited EPG information provision processing unit 183 advances the processing to step S83, reads out the requested edited EPG information from the edited EPG information storing unit 184, and acquires the EPG information.

In step S84, the edited EPG information provision processing unit 183, which has read out and acquired the requested edited EPG information, controls the communication unit 164 to transmit the acquired edited EPG information to the hard disk recorder 63, which is the request source, and ends the edited EPG provision processing.

If the requested edited EPG information is not stored in the edited EPG information storing unit 184 and it is judged in step S82 that the requested edited EPG information is not present, the edited EPG information provision processing unit 183 advances the processing to step S85, performs error response processing, for example, transmits an error message to the hard disk recorder 63, and ends the edited EPG information provision processing.

In response to this edited EPG information provision processing, the CPU 231 of the hard disk recorder 63 uses the EPG information acquisition processing control unit 245 to execute edited EPG information acquisition processing and acquires edited EPG information from the editing server 32. The CPU 231 uses a WEB browser prepared in the program memory 208 or the like in advance to cause the monitor 64 to display the acquired edited EPG 261.

The edited EPG information acquisition processing by the CPU 231 of the hard disk recorder 63 will be explained with reference to a flowchart of FIG. 14.

First, in step S101, the CPU 231 of the hard disk recorder 63 controls the communication unit 215 on the basis of an instruction of a user to request edited EPG information from the editing server 32. As described above, the edited EPG information provision processing unit 183 of the editing server 32 searches for the edited EPG information stored in the edited EPG information storing unit 184. If the requested edited EPG information is present, the edited EPG information provision processing unit 183 supplies the edited EPG information to the hard disk recorder 63. If the requested edited EPG information is not present, the edited EPG information provision processing unit 183 returns an error response to the CPU 231.

In step S102, the CPU 231, which has requested edited EPG information, controls the communication unit 215 to judge whether the requested EPG information has been acquired. If it is judged that the requested edited EPG information has been acquired, the CPU 231 advances the processing to step S103 and holds the acquired edited EPG information in the EPG data memory 207. In step S104, the CPU 231 uses a GUI (Graphical User Interface) such as a predetermined WEB browser, which is prepared in the program memory 208 or the like in advance, to generate an image, on which the acquired edited EPG information is displayed, and supply the image to the monitor 64 to thereby cause the monitor 64 to display the edited EPG 261. The CPU 231, which has caused the monitor 64 to display the edited EPG, ends the edited EPG information acquisition processing.

If it is judged in step S102 that the requested edited EPG information has not been acquired because, for example, an error response is acquired from the editing server 32, in step S105, the CPU 231 judges whether the same edited EPG information should be requested again.

When it is judged, on the basis of setting or the like decided in advance, that the same edited EPG information should be requested again, the CPU 231 returns the processing to step S101 and repeats the processing in the subsequent steps. If it is judged that the edited EPG information should not be requested again, the CPU 231 advances the processing to step S106 and executes error processing. For example, the CPU 231 controls the OSD control unit 211 to display an error message on the display or controls the work memory 209 to record an error log. When the processing in step S106 ends, the CPU 231 ends the edited EPG information acquisition processing.

Figure 14:
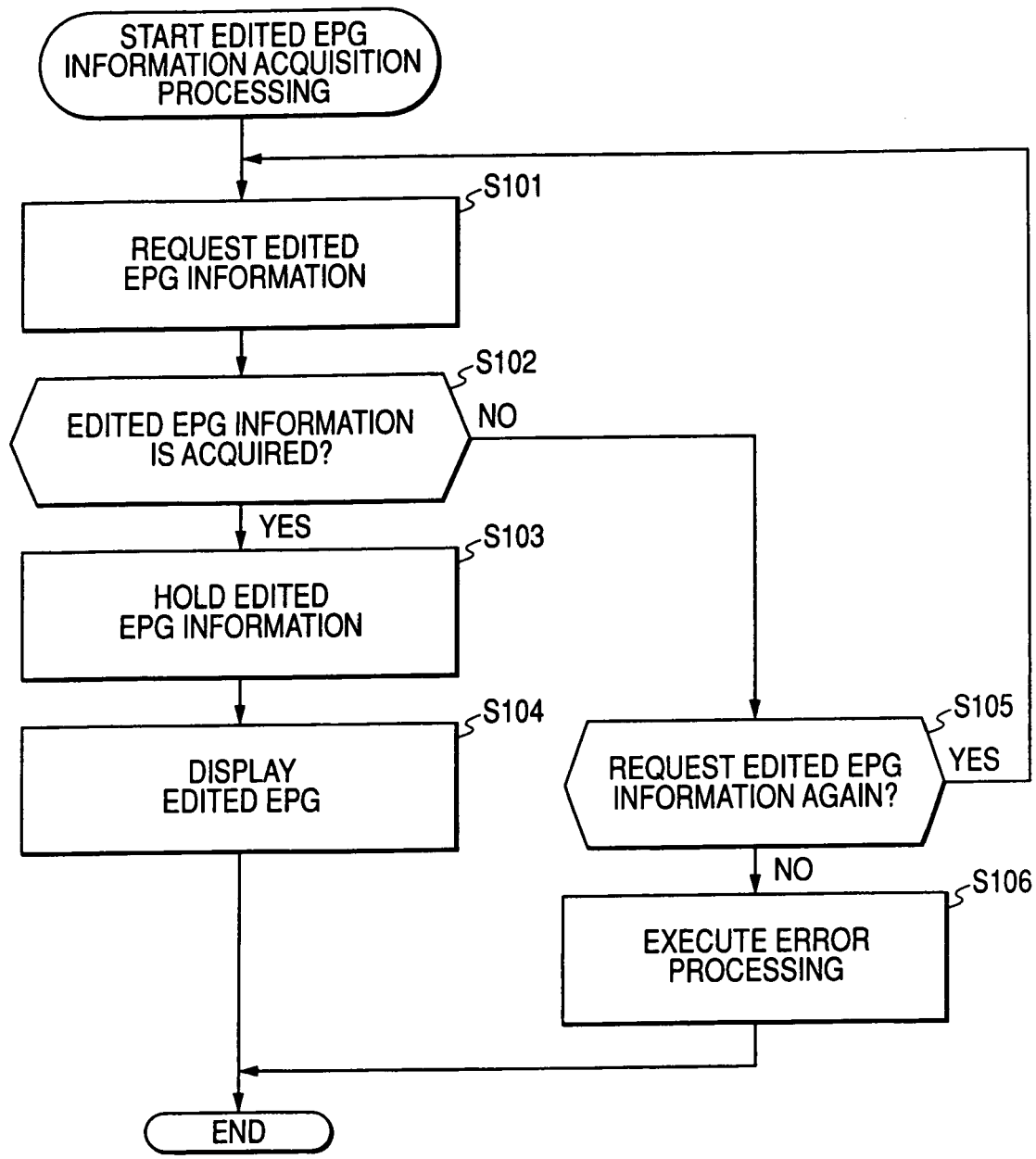
FIG. 14 is a flowchart for explaining edited EPG information acquisition processing by the hard disk recorder in FIG. 3.
Figure 15:
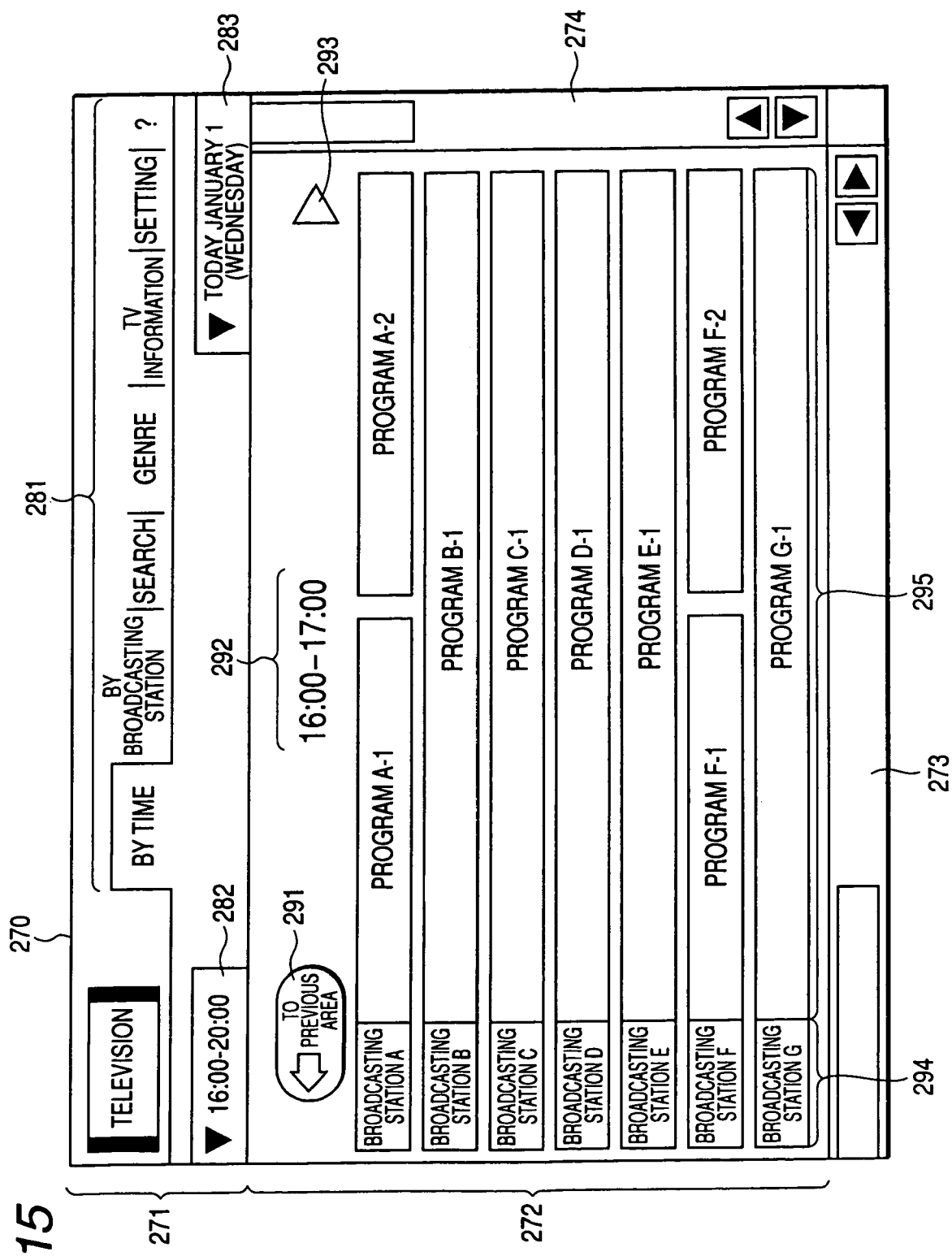
FIG. 15 is a diagram showing an example of display of a WEB browser.

FIG. 15 is a diagram showing an example of a display screen for an edited EPG that is displayed on the monitor 64 according to the processing in step S104 of the flowchart of FIG. 14.

In FIG. 15, a WEB browser 270 serving as a GUI for displaying the edited EPG 261 includes two frames, namely, a first frame 271 and a second frame 272, and a horizontal scroll bar 273 and a vertical scroll bar 274.

The first frame 271 has a display switching tab 281 serving as a GUI for selecting information to be displayed in the second frame 272, a time frame pull-down menu 282 for designating a time frame of an EPG to be displayed in the second frame 272, and a date pull-down menu 283 for designating a date of the EPG to be displayed in the second frame 272.

A part of the edited EPG 261 shown in FIG. 12 is displayed in the second frame 272. A size of the second frame 272 is the same as a size of one area (areas 261-1 to 261-8) of the edited EPG 261 in FIG. 12.

Note that, in FIG. 15, an EPG (the area 261-1 of the edited EPG 261 in FIG. 12) "by time" of a time frame "16:00" to "20:00" of "today January 1 (Wednesday)" is displayed in the second frame 272.

The user can change (scroll) a position in the edited EPG 261 displayed in the second frame 272 by operating the remote controller or the input unit 216 of the hard disk recorder 63.

In FIG. 15, the area 261-1 of the edited EPG 261 is displayed in the second frame 272. The user can display the other areas (the areas 261-2 to 261-7) in the second frame 272 by scrolling the edited EPG 261.

In FIG. 15, buttons 291 and 293 serving as software buttons for displaying left and right areas (an area one hour before and an area one hour ahead) are provided in an upper left part and an upper right part of the area 261-1 displayed in the second frame 272, respectively.

As shown in FIG. 12, the buttons 291 and 293 are provided in all the areas 261-1 to 261-8.

Note that, in the areas 261-1 and 261-5, which are areas showing programs from 16 o'clock to 17 o'clock, an area one hour before (15 o'clock to 16 o'clock) is present in an edited EPG of a time frame (12 o'clock to 16 o'clock) different from a time frame of the edited EPG 261 (16 o'clock to 20 o'clock) (a different WEB page).

Therefore, the button 291 in the areas 261-1 and 261-5 is constituted by a software button that is operated by the user to display the edited EPG (the edited EPG of 12 o'clock to 16 o'clock) in the second frame 272.

In other words, the button 291 in this case is a software button that is operated by the user to display, in the second frame 272, an area corresponding to the same broadcasting stations as broadcasting stations, to which the area 261-1 corresponds, of last one hour (15 o'clock to 16 o'clock) of an edited EPG (a WEB page) in an immediately preceding time frame (12 o'clock to 16 o'clock).

In the areas 261-4 and 261-8 that are areas showing programs from 19 o'clock to 20 o'clock, an area one hour ahead (20 o'clock to 21 o'clock) is present in an edited EPG of a time frame (20 o'clock to 24 o'clock) different from the time frame (16 o'clock to 20 o'clock) of the edited EPG 261 (a different WEB page).

Therefore, the button 293 of the areas 261-4 and 261-8 is constituted by a software button that is operated by the user to display the edited EPG (the edited EPG of 20 o'clock to 24 o'clock) in the second frame 272.

In other words, the button 293 in this case is a software button that is operated by the user to display an area corresponding to the same broadcasting stations as broadcasting stations, to which the respective areas correspond, of first one hour (20 o'clock to 21 o'clock) of an edited EPG (a WEB page) in an immediately following time frame (20 o'clock to 24 o'clock).

Note that the button 291 or 293 may be constituted by a mark adjusted to a position in each of the areas 261-1 to 261-8 of the edited EPG 261.

For example, in the areas 261-1 and 261-5, a mark indicating that an area not displayed is present on the right side may be provided in an upper right part thereof. In the areas 261-2, 261-3, 261-6, and 261-7, a mark indicating that an area not displayed is present on the left side may be provided in an upper left part thereof and a mark indicating that an area not displayed is present on the right side may be provide in an upper right part thereof. In the areas 261-4 and 261-8, a mark indicating that an area not displayed is present on the left side may be provided in an upper left part thereof.

In short, in this case, in an upper left part or an upper right part of a displayed area, instead of a button that is operated by the user to change an area to be displayed in the same edited EPG (WEB pate), a mark indicating that an area is present in that direction is displayed.

In FIG. 15, an area corresponding to the same broadcasting station as a broadcasting station, to which the area 261-1 corresponds, of first one hour (12 o'clock to 13 o'clock) of an edited EPG (a WEB page) in an immediately preceding time frame (12 o'clock to 16 o'clock) may be displayed in the second frame 272.

In this case, when the user operates the button 291, an area corresponding to the same broadcasting station as a broadcasting station, to which the area 261-5 corresponds, of first one hour (12 o'clock to 13 o'clock) of an edited EPG (a WEB page) in an immediately preceding time frame (12 o'clock to 16 o'clock) is displayed in the same manner in the area 261-5.

In FIG. 15, between the buttons 291 and 293 described above, that is, in an upper center part of the area 261-1 displayed in the second frame 272, a time indication 292 indicating time, to which a program guide currently displayed in the second frame 272 corresponds, is provided.

As shown in FIG. 12, this time indication 292 is provided in all the areas 261-1 to 261-8. However, in the time indication 292, time corresponding to the respective areas is displayed. In the areas 261-1 and 261-5, "16:00 to 17:00" is displayed. In the areas 261-2 and 261-6, "17:00 to 18:00" is displayed. In the areas 261-3 and 261-7, "18:00 to 19:00" is displayed. In the areas 261-4 and 261-8, "19:00 to 20:00" is displayed.

Referring back to FIG. 15, a broadcasting station section 294 is provided below the button 291 of the area 261-1 displayed in the second frame 272, respective broadcasting stations are arranged in a vertical direction, a program section 295 is provided on the right side of the broadcasting station section 294, and programs to be broadcasted by the respective broadcasting stations are displayed with a horizontal direction as a time axis.

In the case of FIG. 15, an EPG displayed in the second frame 272 indicates that a "broadcasting station A" broadcasts a "program A-1" from 16 o'clock of "today January 1 (Wednesday) and, after the broadcast of the "program A-1" ends, broadcasts a "program A-2". In addition, this EPG indicates that a "broadcasting station B" broadcasts a "program B-1" from 16 o'clock, a "broadcasting station C" broadcasts a "program C-1" from 16 o'clock, a "broadcasting station D" broadcasts a "program D-1" from 16 o'clock, and a "broadcasting station E" broadcasts a "program E-1" from 16 o'clock. Moreover, this EPG indicates that a "broadcasting station F" broadcasts a "program F-1" from 16 o'clock and, after the broadcast of the "program F-1" ends, broadcasts a "program F-2" and a "broadcasting station G" broadcasts a "program G-1" from 16 o'clock.

Note that, as shown in FIG. 12, the broadcasting station section 294 and the program section 295 are provided in all the areas 261-1 to 261-8. However, broadcasting stations displayed in the broadcasting station sections 294 of the areas 261-1 to 4 and broadcasting stations displayed in the broadcasting station sections 294 of the areas 261-5 to 261-8 are different from each other.

A structure of a program guide displayed in the program section 295 is different in the respective areas.

Note that, in FIGS. 12 and 15, for explanation, codes associated with the respective broadcasting stations are displayed in the respective programs in the program section 295. However, actually, information such as titles of programs is displayed.

As described above, all the areas 261-1 to 261-8 of the edited EPG 261 displayed in the second frame 272 are constituted by the buttons 291 and 293, the time indication 292, the broadcasting station section 294, and the program section 295. The same information may be displayed in plural areas.

In other words, the edited EPG 261 is constituted such that, for example, even if a user scrolls a display position of the edited EPG 261, important information such as broadcasting station names and time is always displayed.

A case in which a display position of the edited EPG 261 is scrolled horizontally (a case in which the display position is scrolled from the area 261-1 to the area 261-2) will be explained with reference to FIGS. 16 to 19.

Note that, in FIGS. 16 to 19, the buttons 291 and 293, the time indication 292, the broadcasting station section 294, and the program section 295 in the area 261-1 are represented as buttons 291-1 and 293-1, a time indication 292-1, a broadcasting station section 294-1, and a program section 295-1, respectively. The buttons 291 and 293, the time indication 292, the broadcasting station section 294, and the program section 295 in the area 261-2 are represented as buttons 291-2 and 293-2, a time indication 292-2, a broadcasting station section 294-2, and a program section 295-2, respectively.

Figure 16:
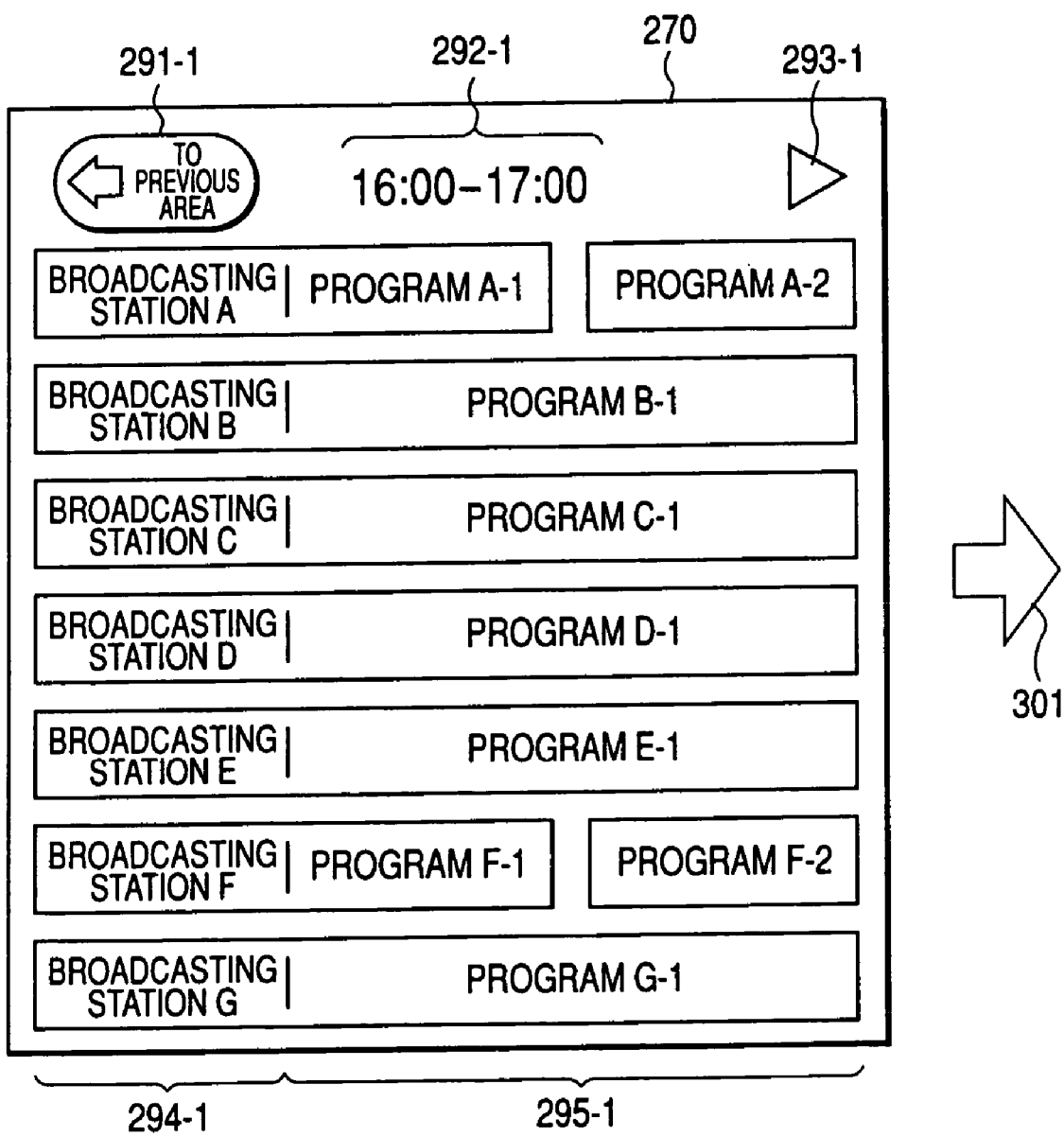
FIG. 16 is a diagram showing a state at the time when a second frame of the WEB browser in FIG. 15 is scrolled horizontally.

First, as shown in FIG. 16, the area 261-1 is displayed in the second frame 272 and the buttons 291-1 and 293-1, the time indication 292-1, the broadcasting station section 294-1, and the program section 295-1 are displayed.

Figure 17:
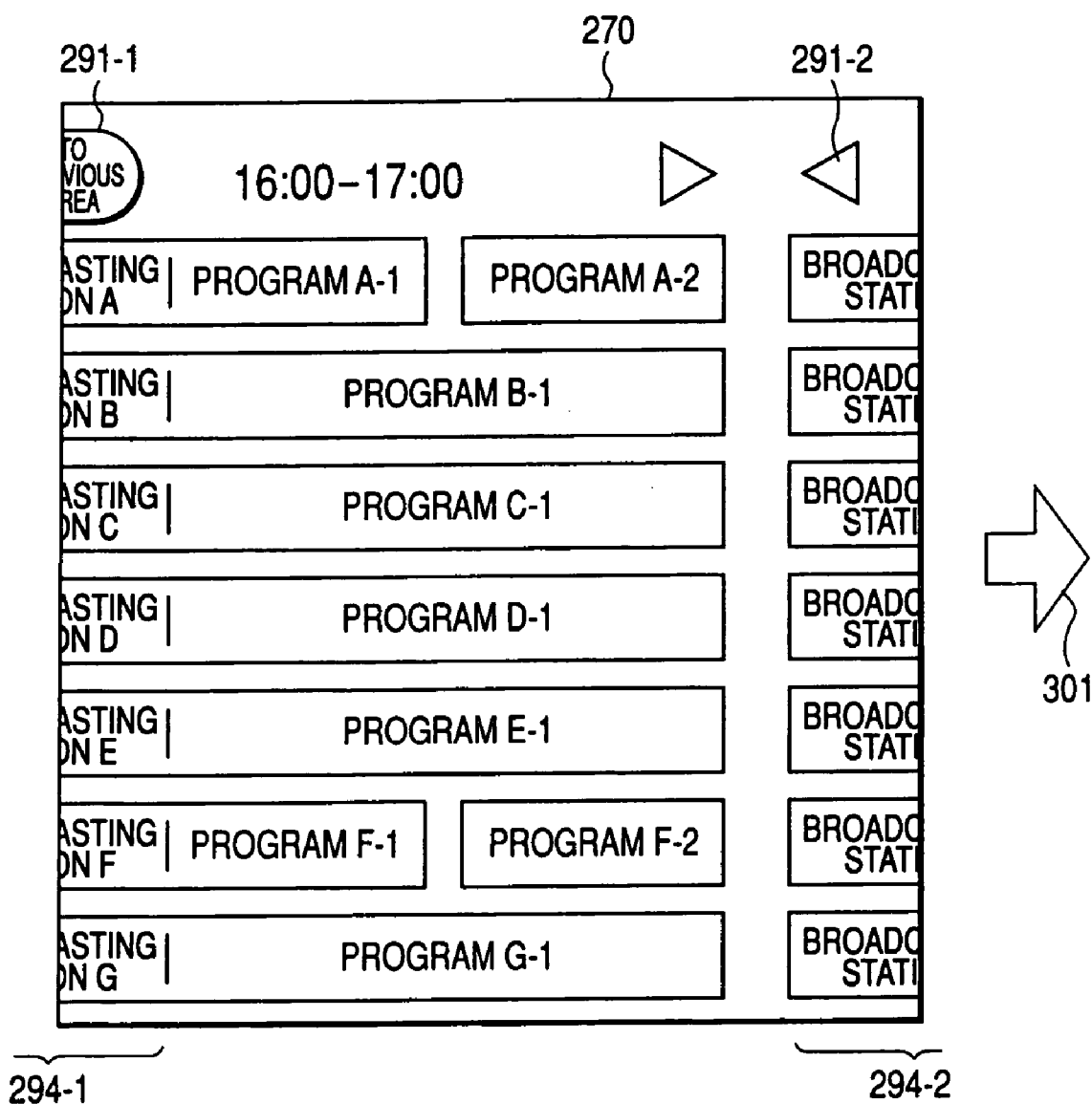
FIG. 17 is a diagram showing a state at the time when the second frame of the WEB browser in FIG. 16 is further scrolled horizontally.

In this state, when a display position is scrolled in a direction of an arrow 301 (a left direction in the figure) by user operation, the display position changes to a position shown in FIG. 17.

At this point, the button 291-1 and the broadcasting station section 294-1 in the area 261-1, which are displayed in FIG. 16, move from the left end to the outside of the second frame 272 and cease from being displayed. At the same time, the button 291-2 and the broadcasting station section 294-2 in the area 261-2, which are not displayed in FIG. 16, move from the right end of the second frame 272 to the inside of the second frame 272 and begin to be displayed.

Figure 18:
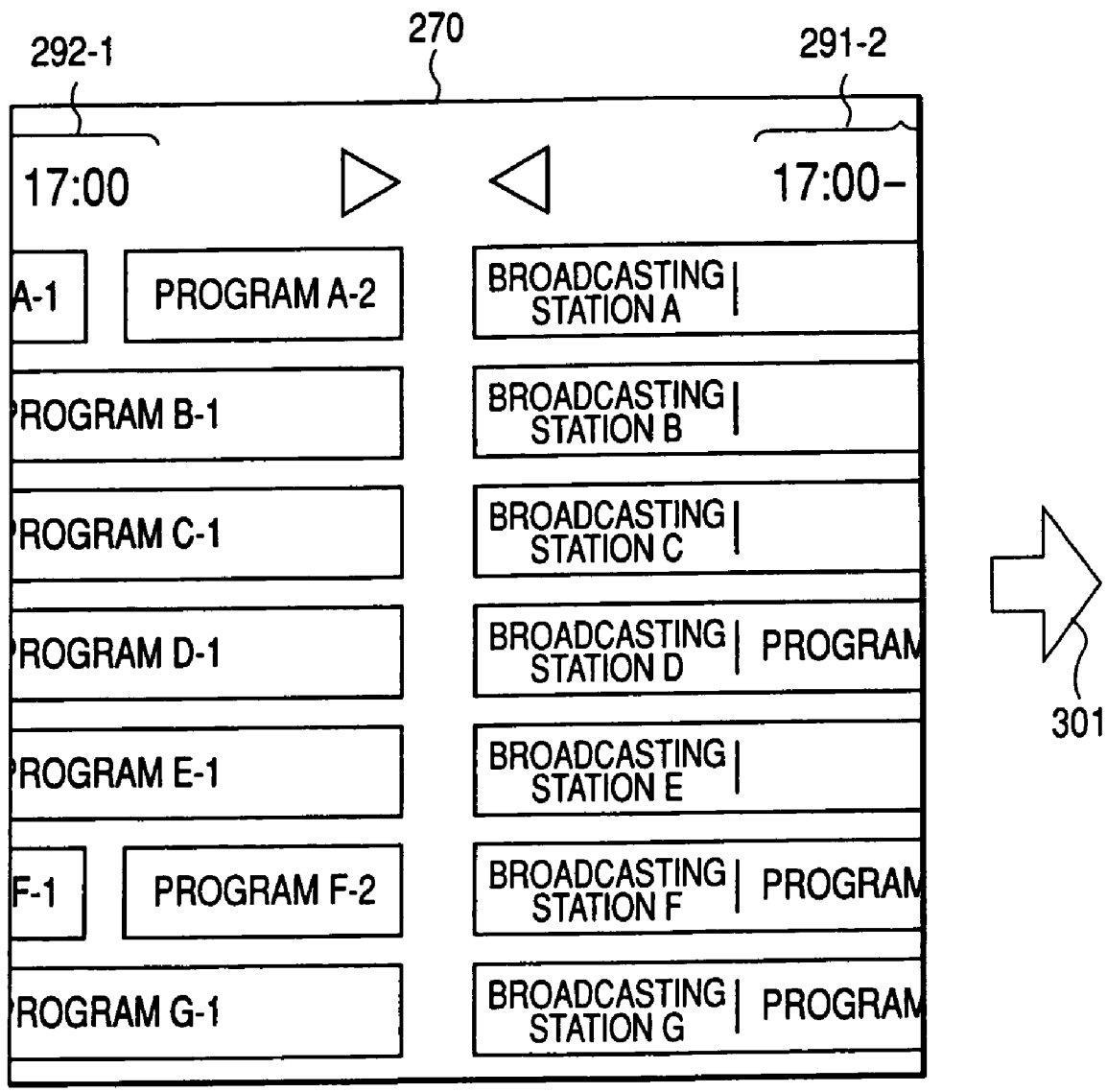
FIG. 18 is a diagram showing a state at the time when the second frame of the WEB browser in FIG. 17 is further scrolled horizontally.

In this state, when the display position is further scrolled in the direction of the arrow 301 (the left direction in the figure) by user operation, the display position changes to a position shown in FIG. 18.

At this point, the time indication 292-1 in the area 261-1, which is displayed in FIGS. 16 and 17, moves from the left end to the outside of the second frame 272 and ceases from being displayed. At the same time, the time indication 292-2 and the broadcasting station section 294-2 in the area 261-2, which are not displayed in FIGS. 16 and 17, move from the right end of the second frame 272 to the inside of the second frame 272 and begins to be displayed.

In this state, when the display position is further scrolled in the direction of the arrow 301 (the left direction in the figure) by user operation, similarly, the button 293-1 ceases from being displayed and the button 293-2 begins to be displayed. Finally, as shown in FIG. 19, only the area 261-2 is displayed in the second frame 272.

Figure 19:
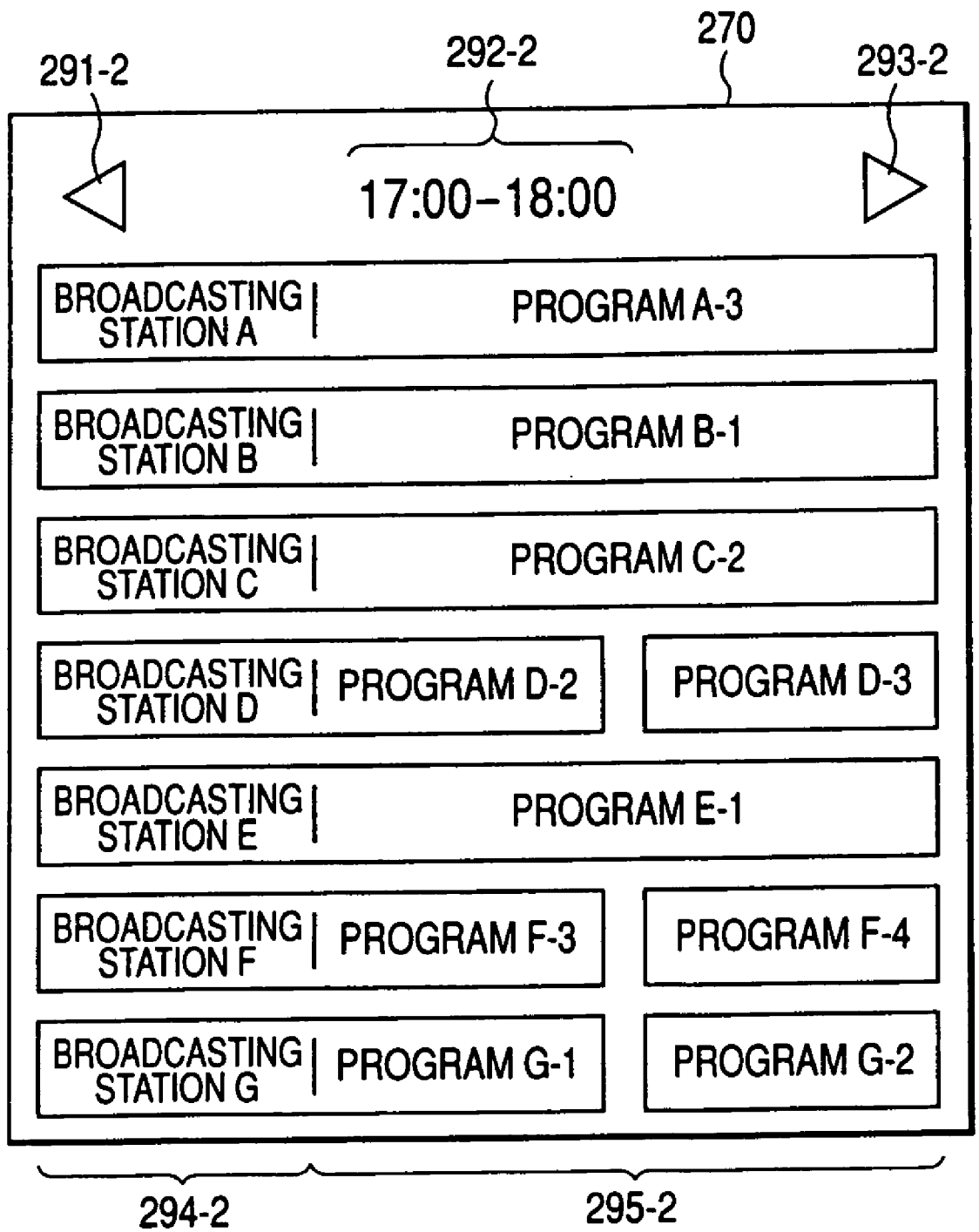
FIG. 19 is a diagram showing a state at the time when the second frame of the WEB browser in FIG. 18 is further scrolled horizontally.

In FIG. 19, the buttons 291-2 and 293-2, the time indication 292-2, the broadcasting station section 294-2, and the program section 295-2 in the area 261-2 are displayed in the second frame 272.

In this way, even if the user scrolls the display position horizontally, indications such as broadcasting station names, time to which programs currently displayed correspond to, and buttons for switching display to an adjacent area are always displayed. Thus, the user can grasp information such as a time frame currently displayed and broadcasting station names easily. Next, with reference to FIGS. 20 to 23, a case in which a display position of the edited EPG 261 is scrolled vertically (a case in which the display position is scrolled from the area 261-1 to 261-5) will be explained.

Note that, in FIGS. 20 to 23, the buttons 291 and 293, the time indication 292, the broadcasting station section 294, and the program section 295 in the area 261-1 are represented as buttons 291-1 and 293-1, a time indication 292-1, a broadcasting station section 294-1, and a program section 295-1, respectively. The buttons 291 and 293, the time indication 292, the broadcasting station section 294, and the program section 295 in the area 261-5 are represented as buttons 291-5 and 293-5, a time indication 292-5, a broadcasting station section 294-5, and a program section 295-5, respectively.

Figure 20:
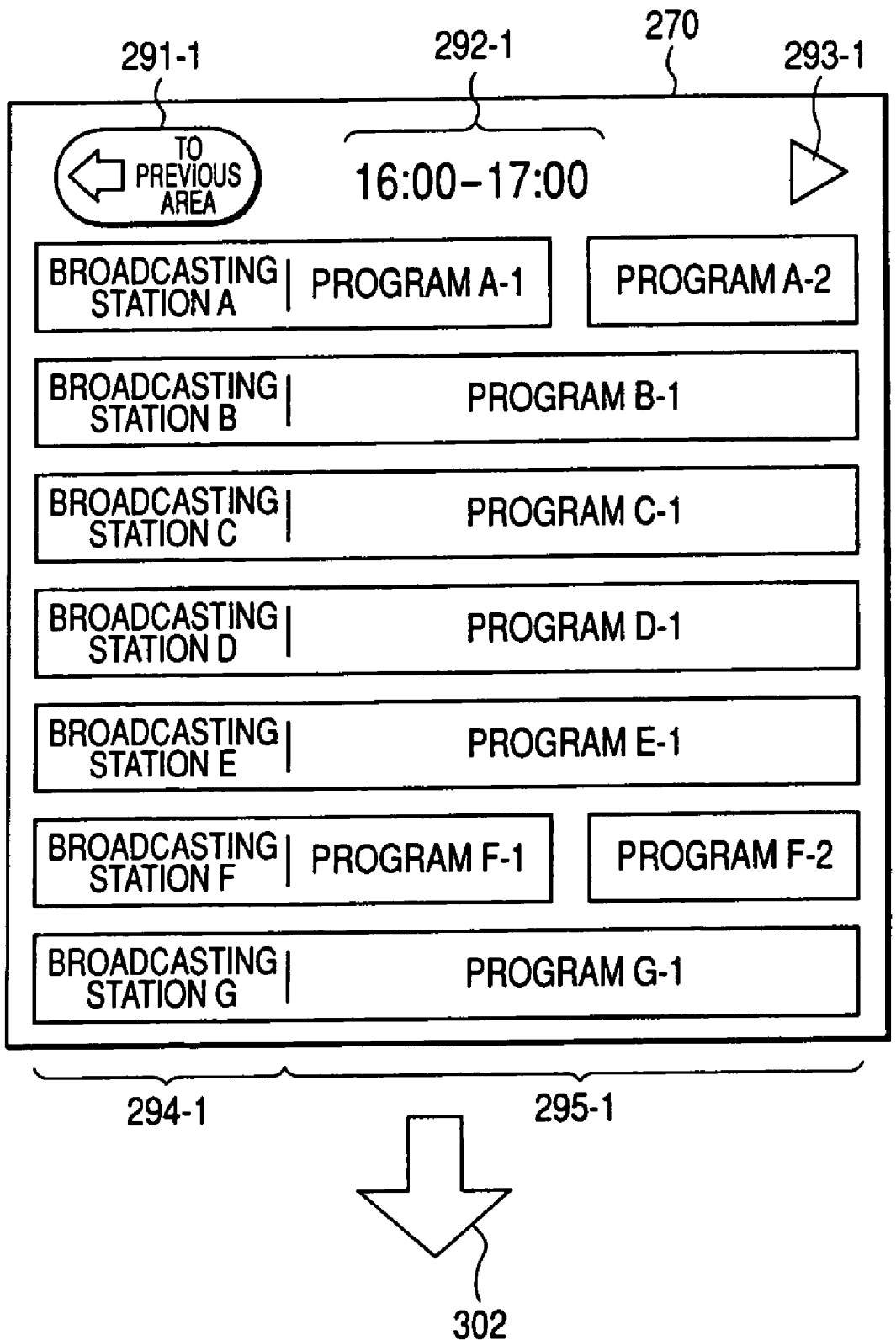
FIG. 20 is a diagram showing a state at the time when the second frame of the WEB browser in FIG. 15 is scrolled vertically.

First, as shown in FIG. 20, the area 261-1 is displayed in the second frame 272 and the buttons 291-1 and 293-1, the time indication 292-1, the broadcasting station section 294-1, and the program section 295-1 are displayed.

Figure 21:
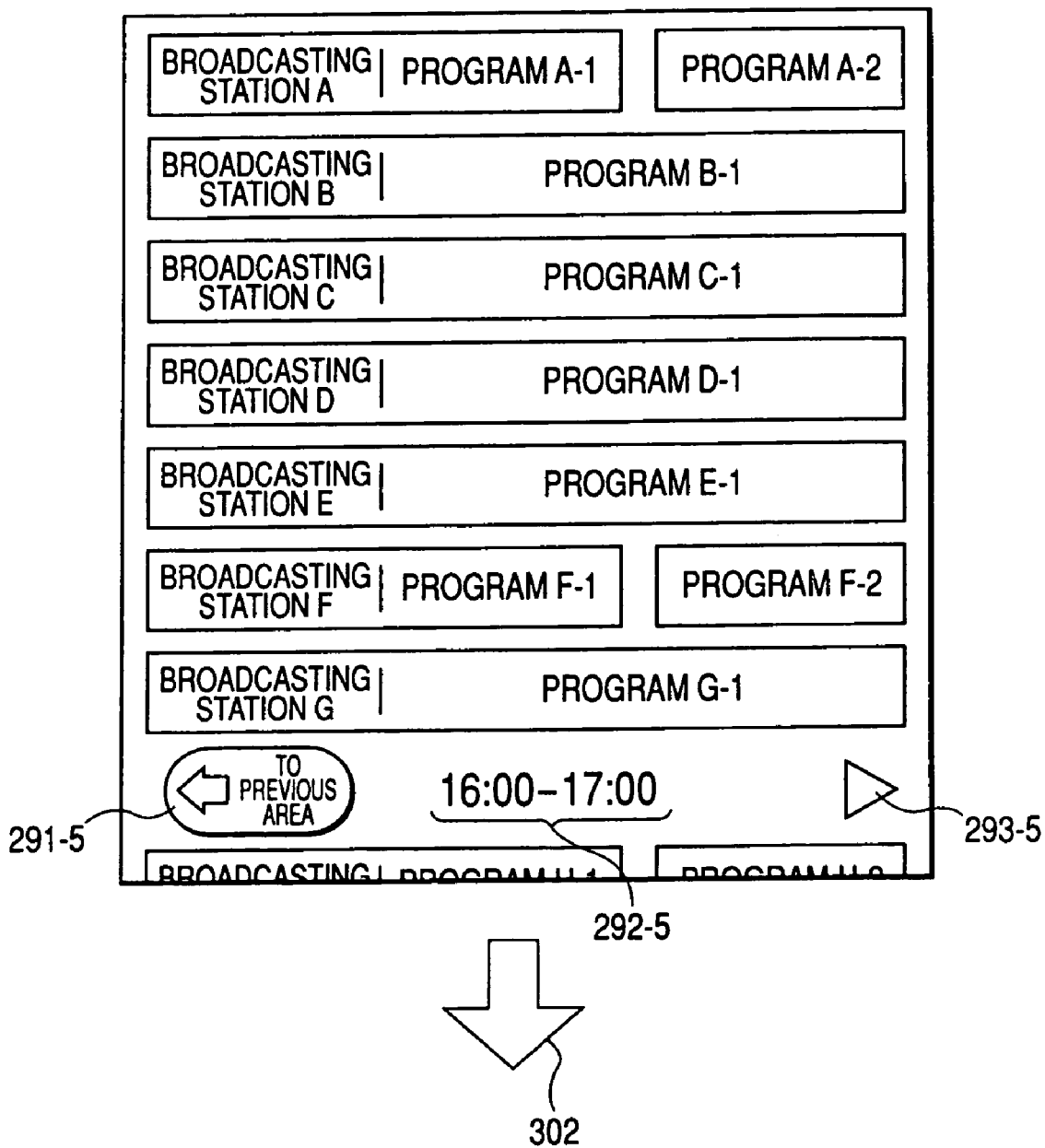
FIG. 21 is a diagram showing a state at the time when the second frame of the WEB browser in FIG. 20 is further scrolled vertically.

In this state, when a display position is scrolled in a direction of an arrow 302 (a downward direction in the figure) by user operation, the display position changes to a position shown in FIG. 21.

At this point, the button 291-1, the time indication 292-1, and the button 293-1 in the area 261-1, which are displayed in FIG. 20, move from the upper end to the outside of the second frame 272 and cease from being displayed. At the same time, the button 291-5, the time indication 292-5, and the button 293-5 in the area 261-5, which are not displayed in FIG. 20, move from the lower end of the second frame 272 to the inside of the second frame 272 and begin to be displayed.

Figure 22:
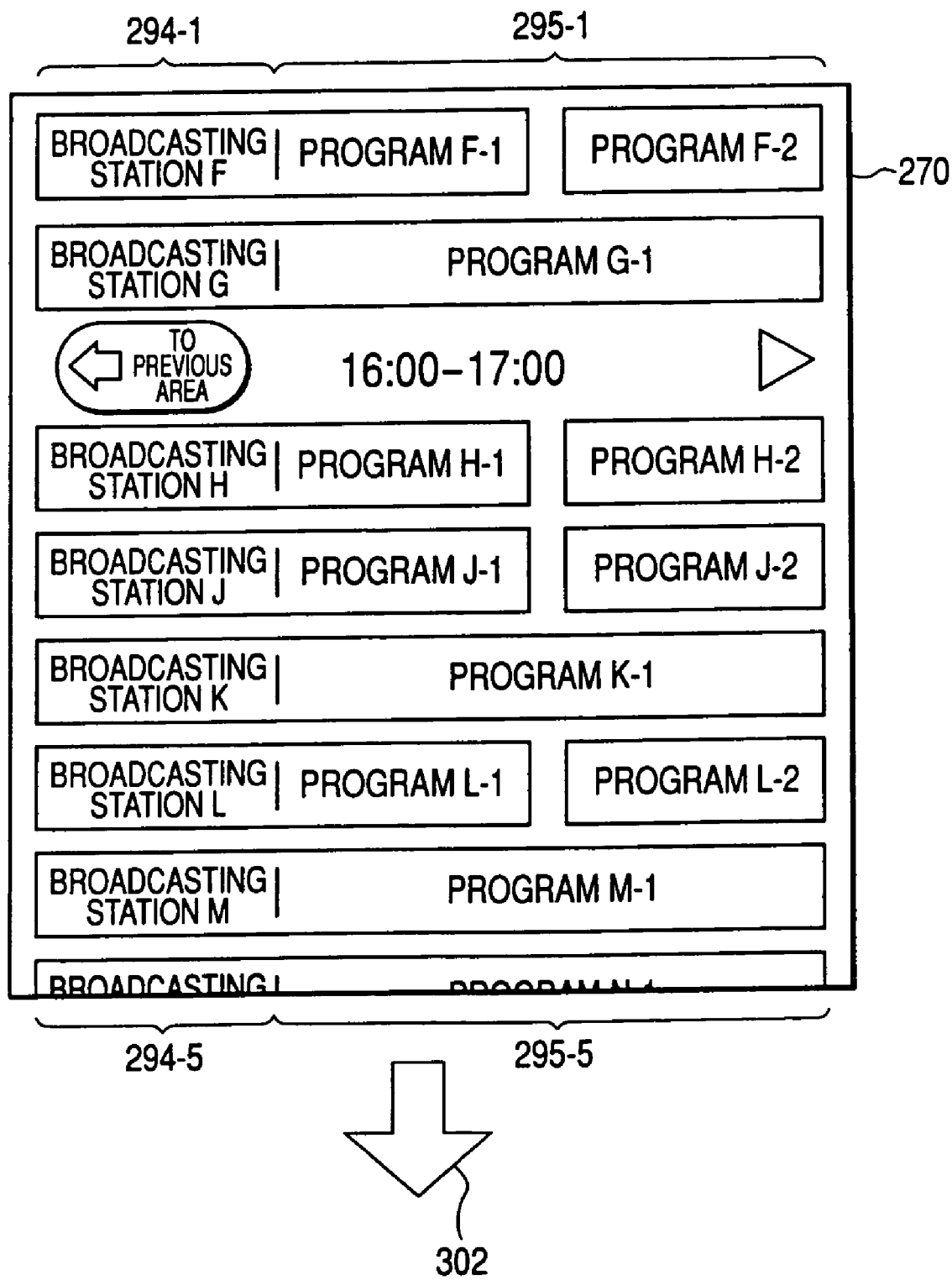
FIG. 22 is a diagram showing a state at the time when the second frame of the WEB browser in FIG. 21 is further scrolled vertically.

In this state, when the display position is further scrolled in the direction of the arrow 302 (the left direction in the figure) by user operation, the display position changes to a position shown in FIG. 22.

At this point, the broadcasting station column 294-1 and the program section 295-1 in the area 261-1, which are displayed in FIGS. 20 and 21, gradually move from the upper end to the outside of the second frame 272 and cease from being displayed. At the same time, the broadcasting station section 294-5 and the program section 295-5 in the area 261-5, which are not displayed in FIGS. 20 and 21, move from the lower end of the second frame 272 to the inside of the second frame 272 and begin to be displayed.

Figure 23:
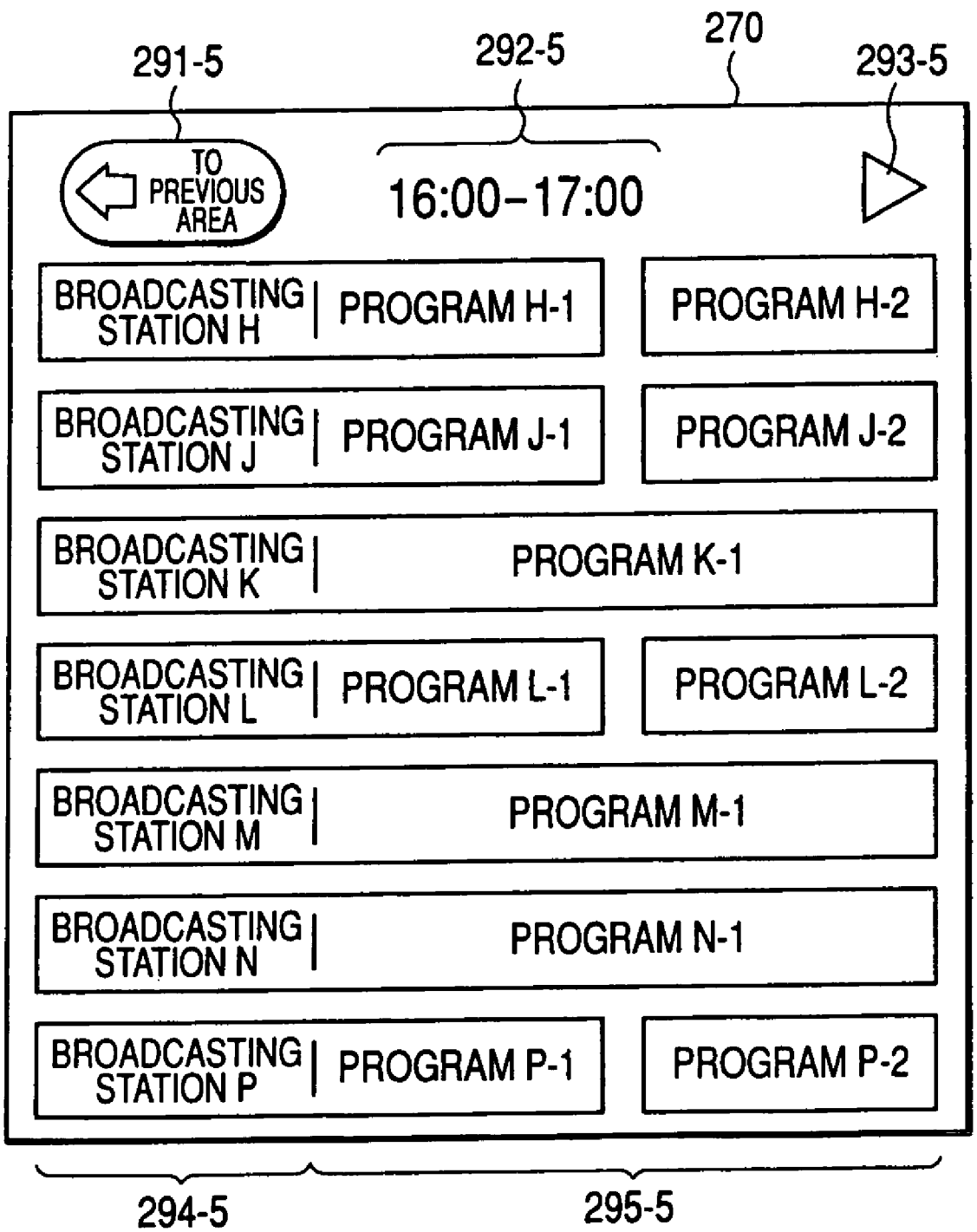
FIG. 23 is a diagram showing a state at the time when the second frame of the WEB browser in FIG. 22 is further scrolled vertically.

In this state, when the display position is further scrolled in the direction of the arrow 302 (the downward direction in the figure) by user operation, finally, as shown in FIG. 23, only the area 261-5 is displayed in the second frame 272.

In FIG. 23, the buttons 291-5 and 293-5, the time indication 292-5, the broadcasting station section 294-5, and the program section 295-5 in the area 261-5 are displayed in the second frame 272.

In this way, even if the user scrolls the display position vertically, indications such as broadcasting station names, time to which programs currently displayed correspond to, and buttons for switching display to an adjacent area are always displayed. Thus, the user can grasp information such as a time frame currently displayed and broadcasting station names easily.

As described above, in the EPG providing system in FIG. 3, the editing server 32 can edit an ordinary EPG provided by the EPG server 31 again, generate EPG information for low resolution, and provide EPG information that is easier to see for a user.

Note that the editing server 32 generates this edited EPG 261 as one WEB page for each time frame and provides the edited EPG 261. Thus, the hard disk recorder 63 can acquire EPG information, which is easier to see for a user, easily and can cause the monitor 64 to display the EPG information without performing special processing such as synchronizing frames.

Note that, in the above description, it is explained that the hard disk recorder 63 acquires edited EPG information edited by the editing server 32. However, the invention is not limited to this and the hard disk recorder 63 may acquire ordinary EPG information provided by the EPG server 31 and edit the EPG information.

Figure 24:
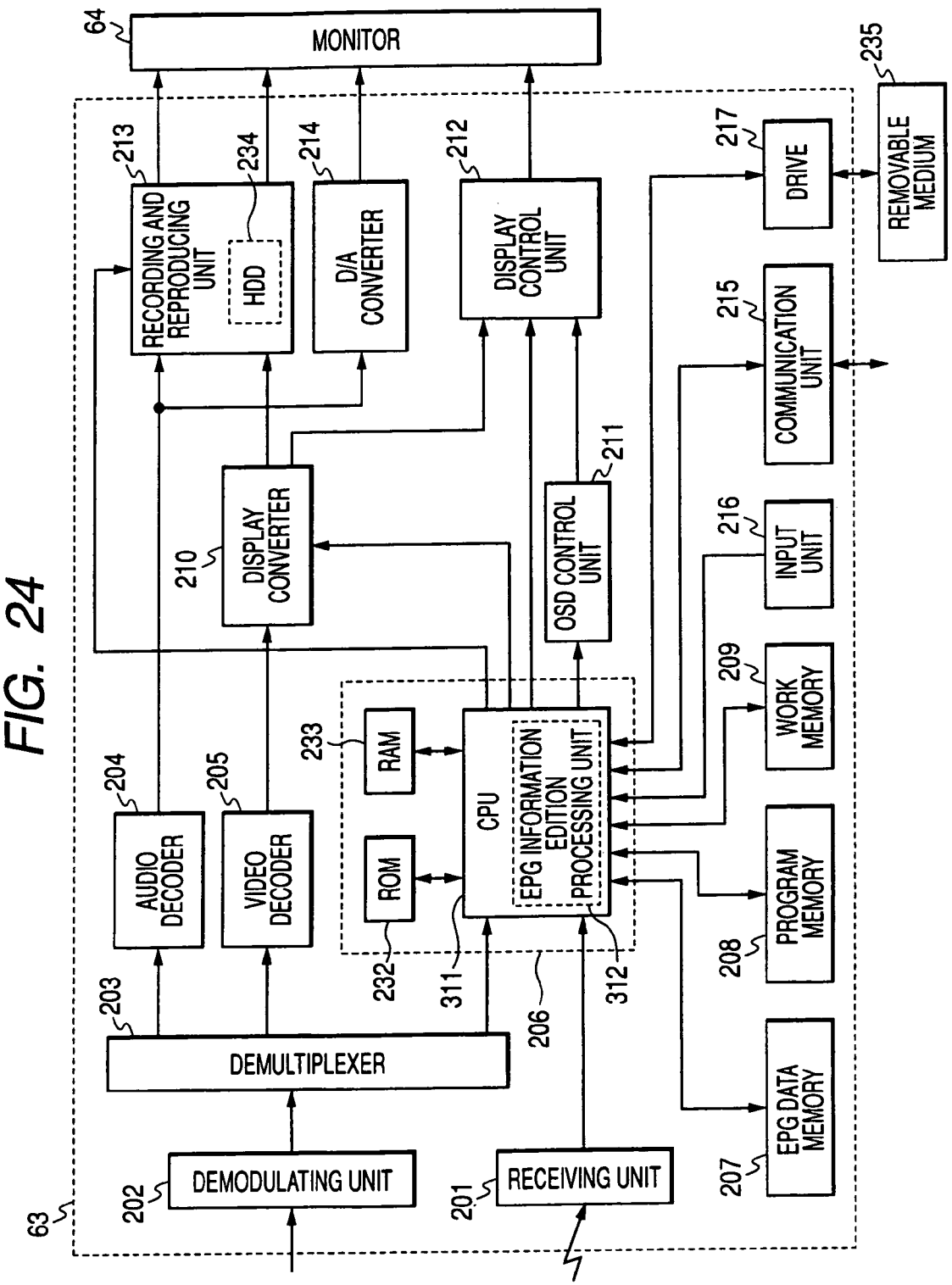
FIG. 24 is a block diagram showing another example of the structure of the hard disk recorder in FIG. 3.

FIG. 24 is a block diagram showing an example of a detailed structure of the hard disk recorder 63 in that case. In FIG. 24, components corresponding to those in FIG. 6 are denoted by the identical reference numerals and detailed explanations of the components are omitted according to circumstances.

A CPU 311 of the recorder control unit 206 loads programs and data, which are stored in the ROM 232, the program memory 208, or the work memory 209 in advance, to the RAM 233 and executes various kinds of processing to thereby control the respective units of the hard disk recorder 63.

Figure 25:
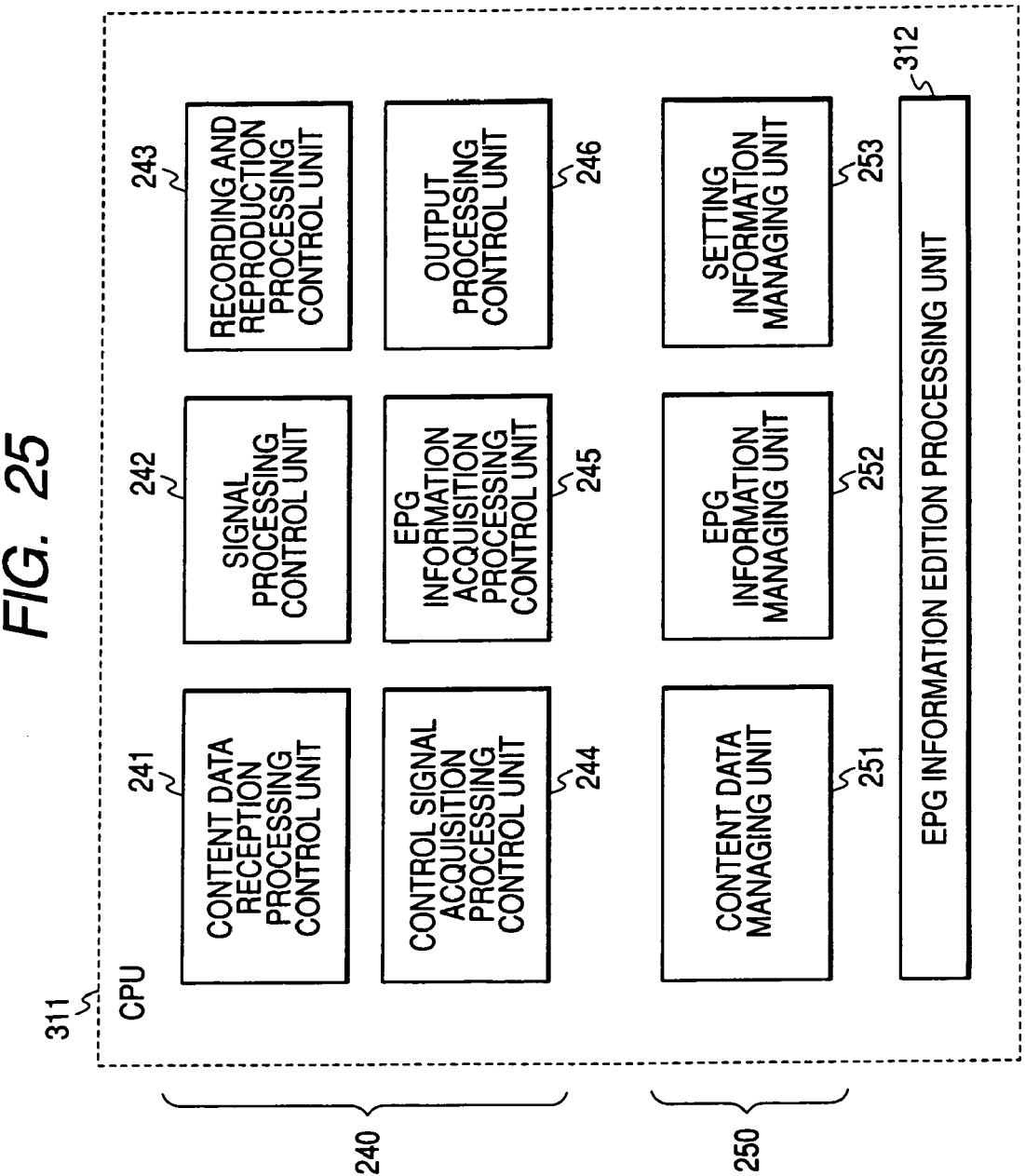
FIG. 25 is a block diagram showing functions included in a CPU in FIG. 24.

As shown in FIG. 25, the CPU 311 incorporates an EPG information edit processing unit 312, which edits EPG information acquired from the EPG server 31, other than the control unit 240 and the managing unit 250.

When EPG information is acquired from the EPG server 31 through the communication unit 215, the EPG information edit processing unit 312 of the CPU 311 edits the acquired EPG information and generates edited EPG information shown in FIG. 12. The CPU 311 causes the EPG data memory 207 to hold the generated edited EPG information or supplies the generated edited EPG information to the OSD control unit 211 and causes the monitor 64 to display the edited EPG information.

EPG information acquisition processing by the CPU 311 of the hard disk recorder 63 will be explained with reference to a flowchart of FIG. 26.

First, in step S121, the CPU 311 of the hard disk recorder 63 controls the communication unit 215 to request EPG information from the EPG server 31. The EPG information provision processing unit 132 of the EPG server 31 searches for the EPG information stored in the EPG information storing unit 133. When the requested EPG information is present, the CPU 311 supplies the EPG information to the hard disk recorder 63 that is a request source. When the requested EPG information is not present, the CPU 311 returns an error response to the CPU 311.

In step S122, the CPU 311, which has requested the EPG information, controls the communication unit 215 to judge whether the requested EPG information has been acquired. If it is judged that the requested EPG information has been acquired, the CPU 311 advances the processing to step S123, edits the acquired EPG information in the EPG information edit processing unit 312, and generates edited EPG information for low resolution.

In step S124, the CPU 311 supplies the generated edited EPG information to the EPG data memory 207 and causes the EPG data memory 207 to hold the edited EPG information. In step S125, the CPU 311 uses a GUI such as a predetermined WEB browser, which is prepared in the program memory 208 or the like in advance, to generate an image, on which the acquired edited EPG information is displayed, and supply the image to the monitor 64 to thereby cause the monitor 64 to display the edited EPG 261. The CPU 311, which has finished the processing in step S125, ends the EPG information acquisition processing.

If it is judged in step S122 that the requested EPG information has not been acquired because, for example, an error response is acquired' from the editing server 32, in step S126, the CPU 311 judges whether the same EPG information should be requested again.

When it is judged, on the basis of setting or the like decided in advance, that the same EPG information should be requested again, the CPU 311 returns the processing to step S121 and repeats the processing in the subsequent steps. If it is judged that the EPG information should not be requested again, the CPU 311 advances the processing to step S127 and executes error processing. For example, the CPU 311 controls the OSD control unit 211 to display an error message on the monitor 64 or controls the work memory 209 to record an error log. When the processing in step S127 ends, the CPU 311 ends the EPG information acquisition processing.

As described above, the hard disk recorder 63 acquires EPG information from the EPG server 31, edits the EPG information according to resolution of the monitor 64, and causes the monitor 64 to display the edited EPG information. Consequently, the hard disk recorder 63 can provide EPG information that is easier to see for a user.

Moreover, when the hard disk recorder 63 edits EPG information, naturally, the hard disk recorder 63 may edit the EPG information using other methods of editing, for example, for determining a size of a space, in which information such as a title of each program (program information) is displayed, on the basis of character information of the program.

Figure 26:
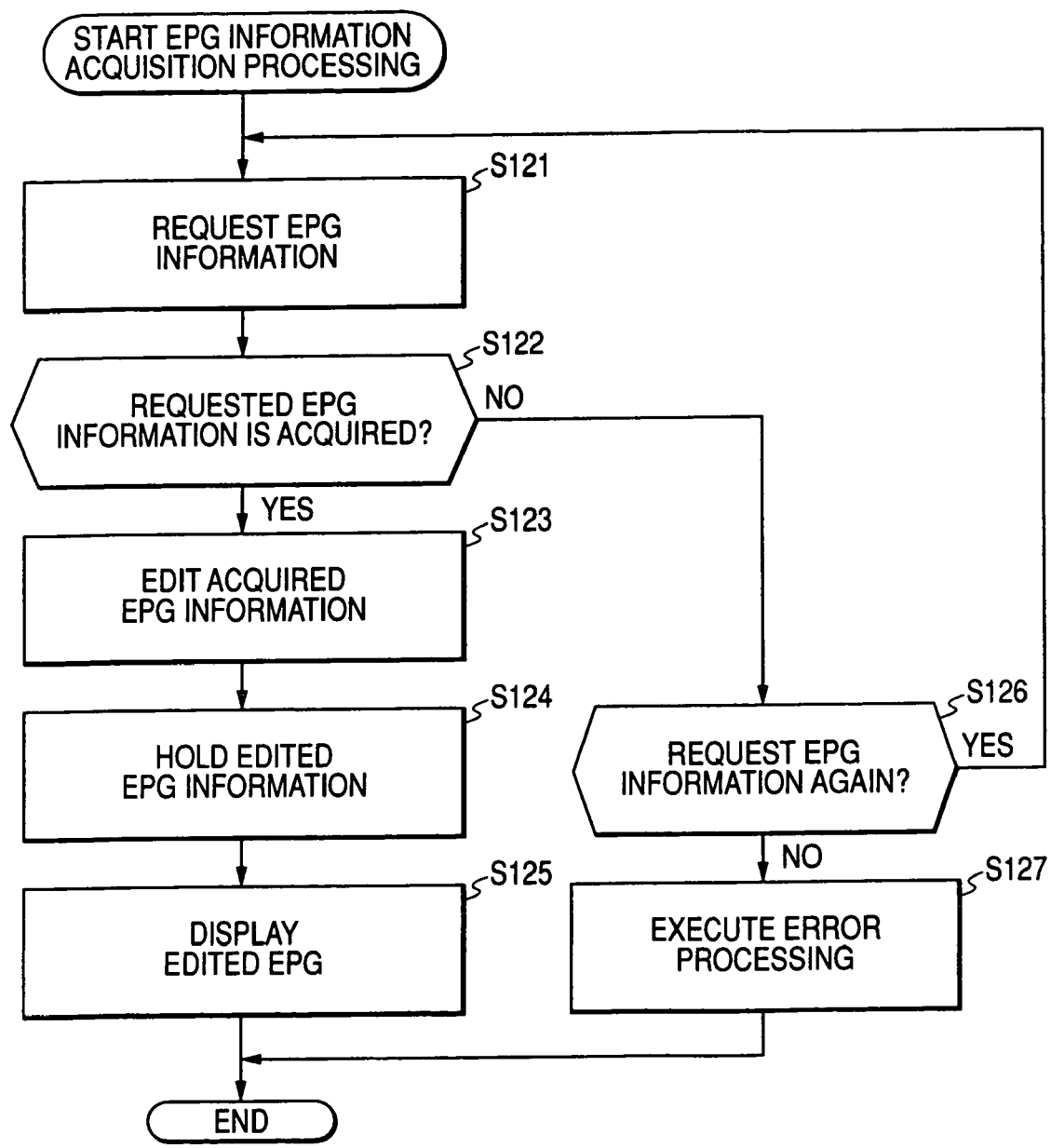
FIG. 26 is a flowchart for explaining EPG information acquisition processing by the hard disk recorder in FIG. 24.
Figure 27:
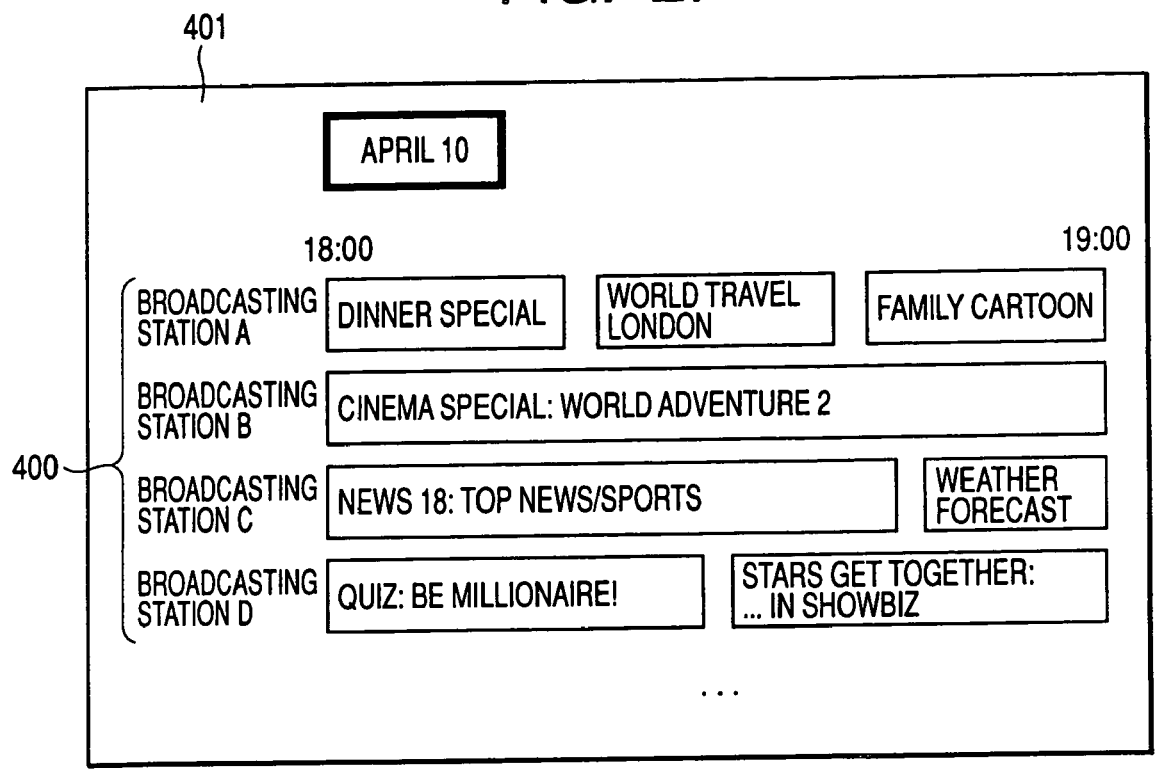
FIG. 27 is a diagram showing an example of an electronic program guide.
Figure 28:
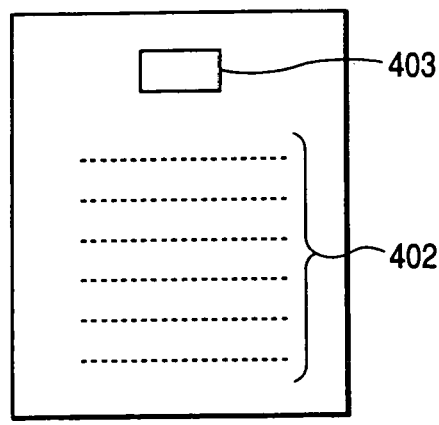
FIG. 28 is a diagram showing an example of detailed information of the electronic program guide in FIG. 27.

For example, in step S123 in FIG. 26, the CPU 311 of the hard disk recorder 63 edits the acquired EPG information and generates edited EPG information for low resolution. In step S124, as shown in FIG. 27, the CPU 311 causes a screen 401 to display electronic program information 400 serving as the edited EPG information. The user clicks or designates a section of a favorite program title (e.g., "Cinema Special: World Adventure Part 2" of the B broadcasting station) of the electronic program information 400 displayed on the screen 401 of the monitor 64. As a result, detailed information 402, in which a detailed content of the program "Cinema Special" is explained, and a recording reservation key 403 are displayed as shown in FIG. 28.

When the user clicks or designates this recording reservation key 403, the CPU 311 of the hard disk recorder 63 automatically records the "Cinema Special" at time 18:00 to 19:00 in the hard disk 234 as shown in the electronic program information 400 in FIG. 27.

Figure 29:
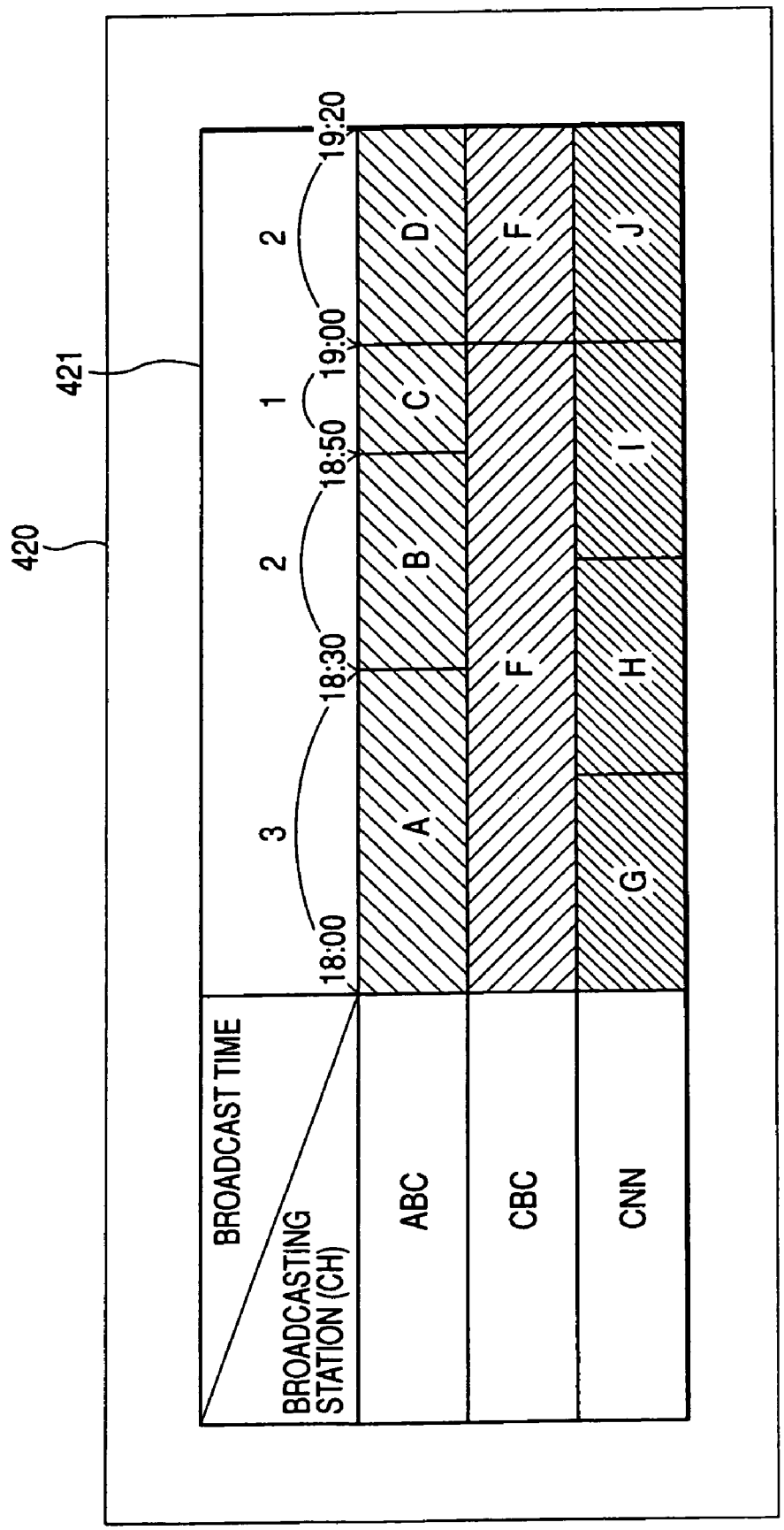
FIG. 29 is a diagram for explaining an example of a relation between a display width of a program title and the number of characters of the program title.
Figure 30:
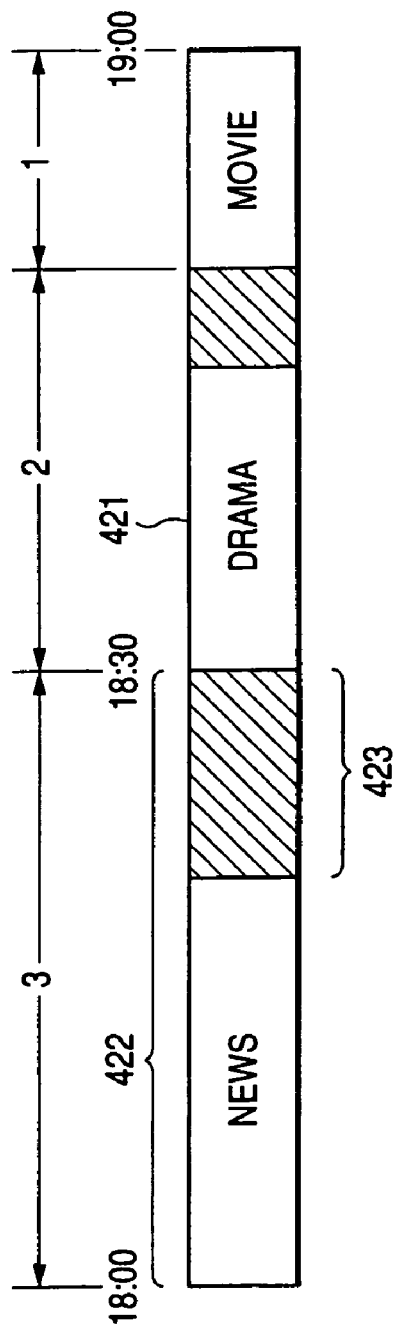
FIG. 30 is a diagram for explaining an example in the case in which an excess space is formed in a program guide in FIG. 29.

For example, as shown in FIG. 29, when the CPU 311 of the hard disk recorder 63 creates such electronic program information 400 in a layout like a program guide 421 in which a display size of information on each program is based on broadcast time of the program, if the number of characters of a title name is small even if a broadcast time length is long, for example, as shown in FIG. 30, and the number of character for a program title is only four characters like "news" as opposed to an entire space 422 for six characters between 18:00 and 18:30, an excess space 423 for two characters is formed to cause a large space between the program and a drama to be broadcasted next.

However, a display device such as the monitor 64, on which the electronic program information 400 is displayed, has low resolution compared with a general display device for a personal computer. Thus, when the electronic program information 400 is displayed on the screen 401 of the display device, a display area of the screen 401 is limited and, compared with the case of the personal computer, an amount of information that can be displayed on one screen is small.

Therefore, since the excess space 423 is formed in the program guide 421 in this way, efficiency for display of program information of the electronic program information 400 decreases.

Figure 31:
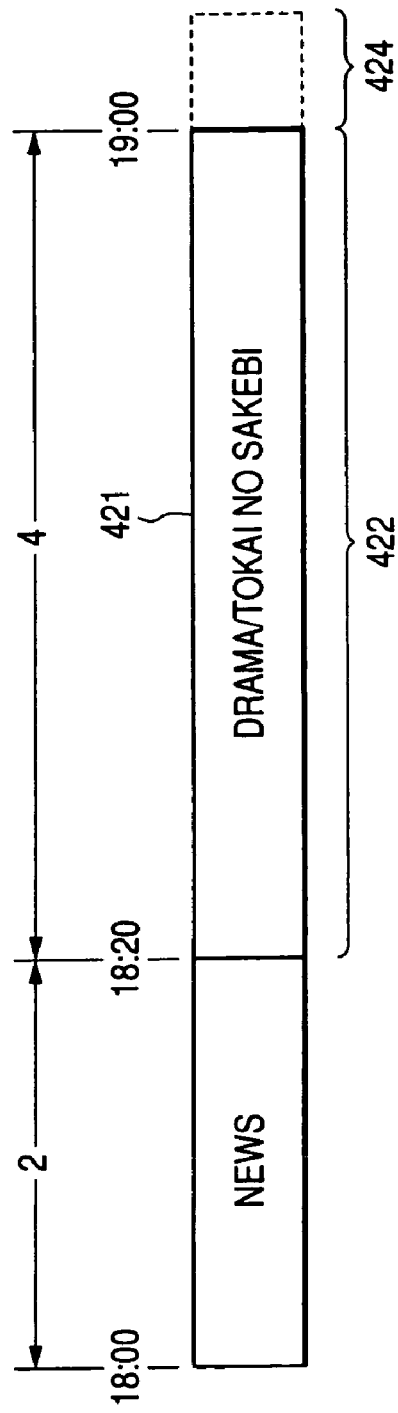
FIG. 31 is a diagram for explaining an example in the case in which a lack of space occurs in the program guide in FIG. 29.

Conversely, for example, when there are plural program titles that should be displayed within a predetermined time, if the number of characters of a title name is large compared with a broadcast time length, as shown in FIG. 31, for example, the number of characters of a program title is nine like "Drama Tokai no Sakebi in Japanese" as opposed to the entire space 422 for eight characters in 18:20 to 19:00, a lack of space 424 for one character occurs and a last character "bi in Japanese" is deleted. Therefore, in some cases, the user cannot understand what the program title means even if the user watches the electronic program information 400 displayed on the screen 401.

Figure 32:
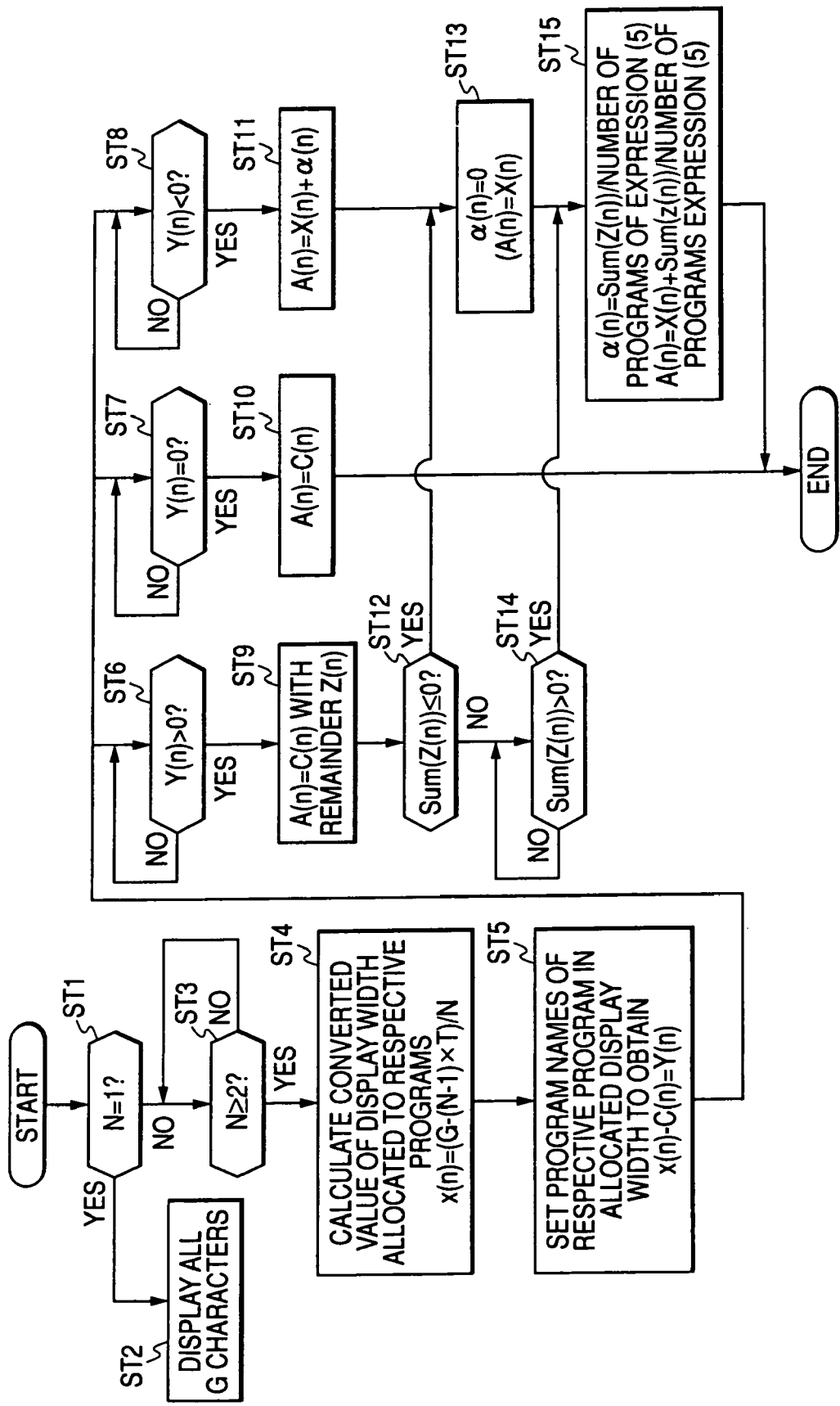
FIG. 32 is a flowchart for explaining a procedure for inserting a program title.

In order to eliminated such a harmful effect, in generating the electronic program information (EPG information) such as a program title in step S123 in FIG. 26, the CPU 311 may decide a display width of program information to be displayed on the basis of the number of characters of the program information and, in step S124, display edited EPG information generated in that way on the screen 401 of the monitor 64. Such an embodiment will be explained with reference to FIGS. 32 to 36. FIG. 32 is a general flowchart for explaining a procedure for inserting a program title in a predetermined character width. FIGS. 33 to 36 are specific diagrams for explaining the same procedure as FIG. 32.

First, with reference to FIG. 32, a case in which, for example, plural titles are generated and displayed in time 18:00 to 19:00 of an A broadcasting station on the screen 401 of the display device will be described in detail.

The processing of the flowchart shown in FIG. 32 and processing in FIGS. 33 to 36 are performed by the CPU 311 in the hard disk recorder 63. When plural programs are broadcasted in a certain time frame, a display width of each program title is changed dynamically in a limited screen width of the screen 401 on the basis of a flowchart described below.

Codes to be processed in the CPU are defined as described below.

G is the total number of characters in a program name display area in an electronic program guide.

N is the number of broadcast programs within a fixed time frame.

C(n) is the number of characters of an nth program name.

T is the number of display characters of delimiters between programs.

A(n) is the number of allocated display characters (calculation result) of an nth program.

In first step ST1, the CPU 311 judges whether the number of broadcast programs within a fixed time frame N is 1. If N is 1, the CPU 311 proceeds to second step ST2 and displays all G characters, which is the number of characters of an nth program, like "Cinema Special: World Adventure Part 2" in a screen width of a B broadcasting station in FIG. 27.

In second step ST2, the CPU 311 judges whether the number of broadcast programs within a fixed time frame N is equal to or larger than 2.

If the number of broadcast programs within a fixed time frame N is equal to or larger than 2 (YES), the CPU 311 proceeds to fourth step ST4 and calculates an estimated value X(n) of a display width allocated to the respective programs on the basis of the following expression (1).

$$X(n)=(G-(N-1)\times T)/N \quad (1)$$

When the estimated value X(n) is calculated with a remainder by expression (1), the CPU 311 allocates one character to each of the programs in order from the first program.

In the next fifth step ST5, the CPU 311 sets program names of the respective programs in the estimated value X(n) of the allocated width. When a value obtained by deducting the number of characters C(n) of an nth program name from the estimated value X(n) is defined as Y(n), the following expression (2) is given.

$$Y(n)=X(n)-C(n) \quad (2)$$

Cases in sixth to eighth steps ST6 to ST8 occur according to a value of Y(n) in expression (2).

Sixth step ST6 is a case of the following expression (3).

$$Y(n)>0 \quad (3)$$

In this case, all the program names can be displayed with a remainder Z=(n) as shown in ninth step ST9. Therefore, in a case of ninth step ST9, a calculation result of the number of allocated display characters A(n) of the nth program is calculated as A(n)=C(n) with a remainder Z(n).

Seventh step ST7 is a case of the following expression (4).

$$Y(n)=0 \quad (4)$$

In this case, all the program names can be displayed with no remainder as shown in tenth step ST10. A calculation result of the number of allocated display characters A(n) of the nth program is calculated as A(n)=C(n) with no remainder, and the processing ends.

Eighth step ST8 is a case of the following expression (5).

$$Y(n)<0 \quad (5)$$

In this case, all the program names cannot be displayed as shown in eleventh step ST11. The calculation result A(n) is calculated with the estimated value X(n) and a remainder character a(n). Therefore, the calculation result A(n) is calculated as A(n)=X(n)+α(n).

The CPU 311 judges in twelfth step ST12 whether the remainder Z (n) occurs in ninth step ST9. If Sum (Z(n))<0, as shown in thirteenth step ST13, since α(n)=0, A(n)=X(n).

When the remainder Z(n) occurs in ninth step ST9 and Sum(Z(n))>0 as shown in fourteenth step ST14, the CPU 311 proceeds to fifteenth step ST15 and allocates the remainder Z(n), which occurs in fourteenth step ST14, equally to programs that have insufficient numbers of characters. As a result, the remainder character α(n) is calculated as α(n)= Sum(Z(n))/the number of programs in expression (5). (If a remainder occurs, the remainder is allocated to programs in order from a program with smallest n.) Therefore, the number of allocated display characters A(n) of the nth program is given by the following expression (6).

A(n)=X(n)+Sum(Z(n))/the number of programs in expression (5) (6)

After fifteenth step ST15 ends in this way, the processing ends.

Note that, when a display area still remains even after the process described above ends, the remainder is allocated equally to the respective programs. When a remainder occurs, it is possible to allocate one character to each of the programs in order from a first program.

The general expressions described above will be explained specifically with reference to FIGS. 33 to 36.

Values of G, N, C, and T described above with reference to FIGS. 33 to 36 are defined as described below, respectively.

G (Total number of characters of a program name display area in an electronic program guide): 20

N (Number of broadcast programs in one hour): 3

C (Number of characters of a program name): Program 1=13, program 2=6, program 3=3

T (Number of display characters of delimiters between programs: 1

Figure 33:
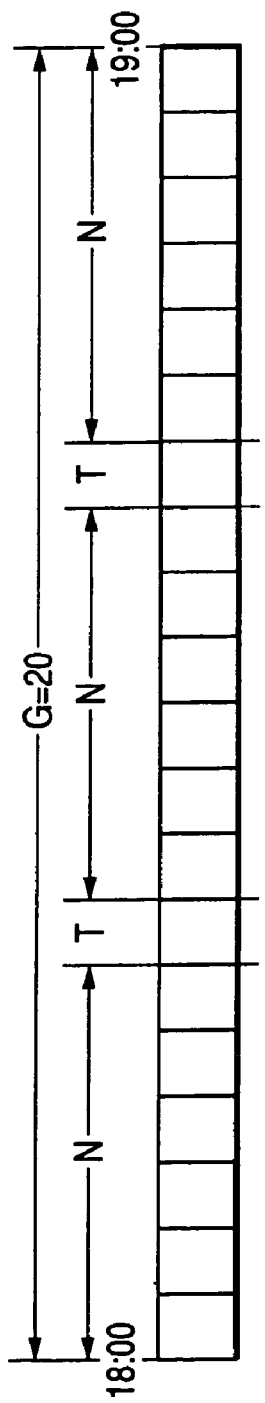
FIG. 33 is a schematic diagram for explaining the procedure for inserting a program title.

First, in FIG. 33, a width to be allocated to the respective programs as in fourth step ST4 in FIG. 32 is calculated as follows.

$$X(n)=(G-(N-1)=T)/N=(20-(3-1)\times1)/3=6$$

The estimated value X(n)=six characters is allocated to the first to the third programs. Note that T is set to 1 in FIG. 33.

Figure 34:
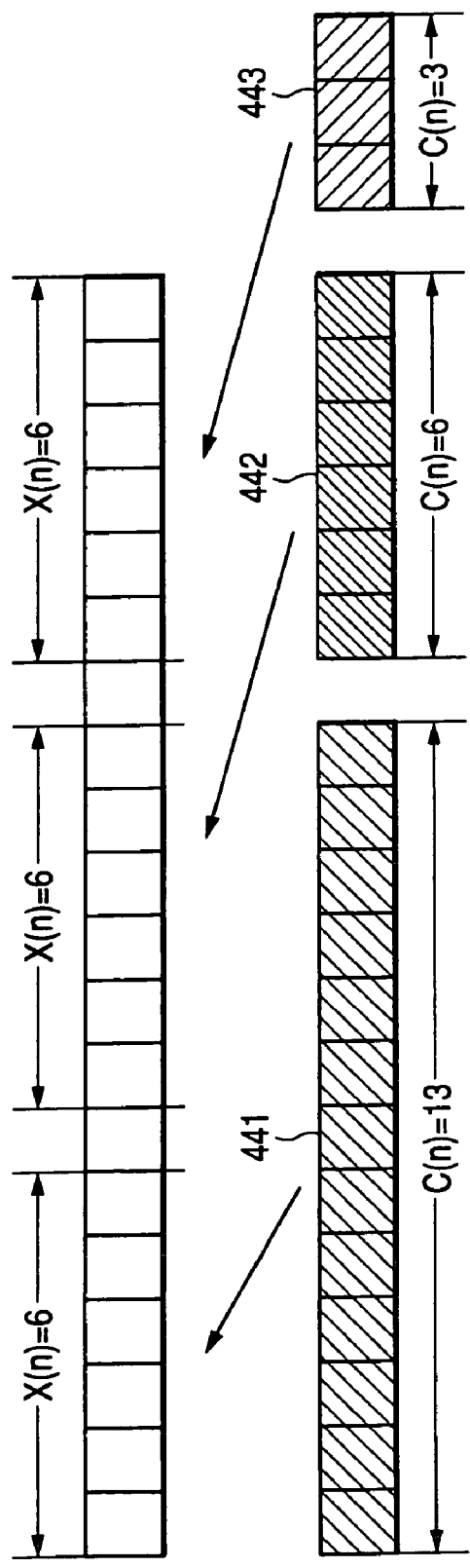
FIG. 34 is a schematic diagram for explaining the procedure for inserting a program title.

Next, in FIG. 34, the number of characters 13 of a first program 441, the number of characters 6 of a second program 442, and the number of characters 3 nof a third program 443 are set in the display width of the estimated value X(n)=6 allocated as shown in fifth step ST5 in FIG. 32.

In the first program 441, Y(n)–X(n)–C(n) is Y(n)=6–13=–7. Thus, the display width is insufficient and Y(n)<0, which indicates the case in eighth step ST8.

In the second program 442, Y(n)=X(n)–C(n) is Y(n)=6–6=0. Thus, Y(n)=0, which indicates the case in seventh step ST7.

In the third program 443, Y(n)=X(n)–C(n) is Y(n)=6–3=3. Thus, the remainder Z(n)=3, which indicates the case in sixth step ST6.

Figure 35:
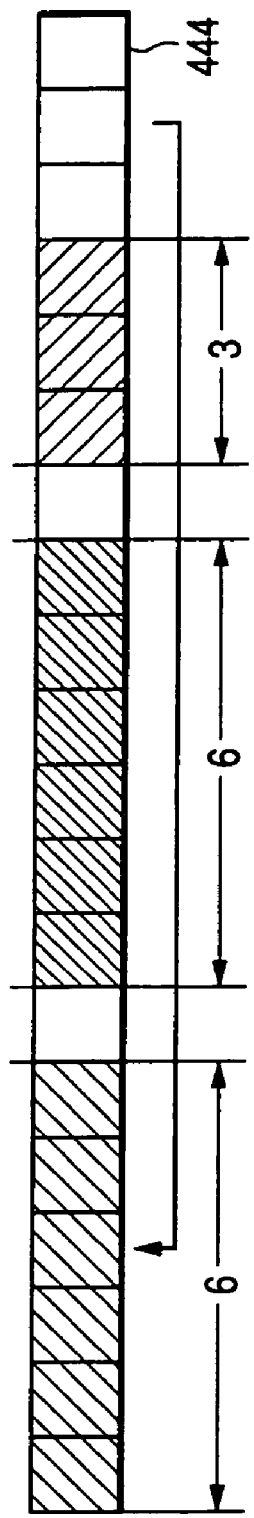
FIG. 35 is a schematic diagram for explaining the procedure for inserting a program title.

In FIG. 35, the number of characters 444 remaining in the third program 443 is added to the first program 441 in which the display width is insufficient.

Figure 36:
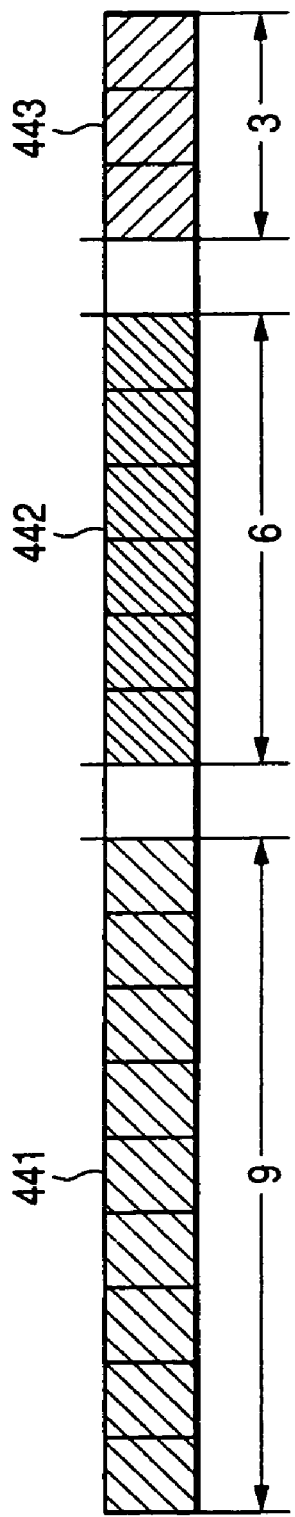
FIG. 36 is a schematic diagram for explaining the procedure for inserting a program title.

Therefore, finally, as shown in FIG. 36, the number of characters of the first program 441 is nine, the number of characters of the second program 442 is six, and the number of characters of the third program 443 is three.

In the constitution described above, in the first program 441, a program title cannot be displayed for four characters (13–9=4). However, since a content of the program can be understood more from a long vocabulary than a short vocabulary, it is meaningful to move the number of excess characters to a longer program title.

In the case explained above, the number of characters remaining after the number of characters is fit in an allocated width in advance is added to the number of characters that is insufficient for an allocated width to dynamically fluctuate a width of the number of characters according to the number of characters of program data. However, it is also possible that, after excluding a required width of delimiters from the total number of characters of a program name display area, plural program names are divided and displayed according to a ratio of the numbers of characters of the plural program names within the total number of characters.

In this way, on the basis of the number of characters of information of respective programs, sizes of display spaces of the information on the respective programs is determined to edit EPG information and generate edited EPG information of such a layout. Consequently, the CPU 311 can display program information, which is easier to see for a user, on a limited screen space effectively.

Note that, in FIG. 3, it is explained as if the EPG server 31 and the editing server 32 are servers of the same service provider 30. However, a service provide having the EPG server 31 and a service provider having the editing server 32 may be different from each other.

In FIG. 3, it is explained as if the EPG server 31 and the editing server 32 are separate units. However, these servers may be constituted as one server.

In FIG. 3, it is explained that the EPG providing system includes each one of the service provider 30, the EPG server 31, the editing server 32, the network 41, the broadcasting station 50, the antenna 51, the client 60, the antenna 61, the tuner 62, the hard disk recorder 63, and the monitor 64. However, it is also possible that the EPG providing system includes a plurality of these devices, the service providers 30, the networks 41, the clients 60, and the like.

In FIG. 3, it is explained that the terminal apparatus of the client 60 is the hard disk recorder 63. However, the terminal apparatus may be any apparatus as long as the apparatus has a function of accessing the EPG server 31 or the editing server 32, acquiring EPG information (or edited EPG information), and displaying the EPG on a display through the network 41. For example, as shown in FIG. 37, the terminal apparatus may be a personal computer.

Figure 37:
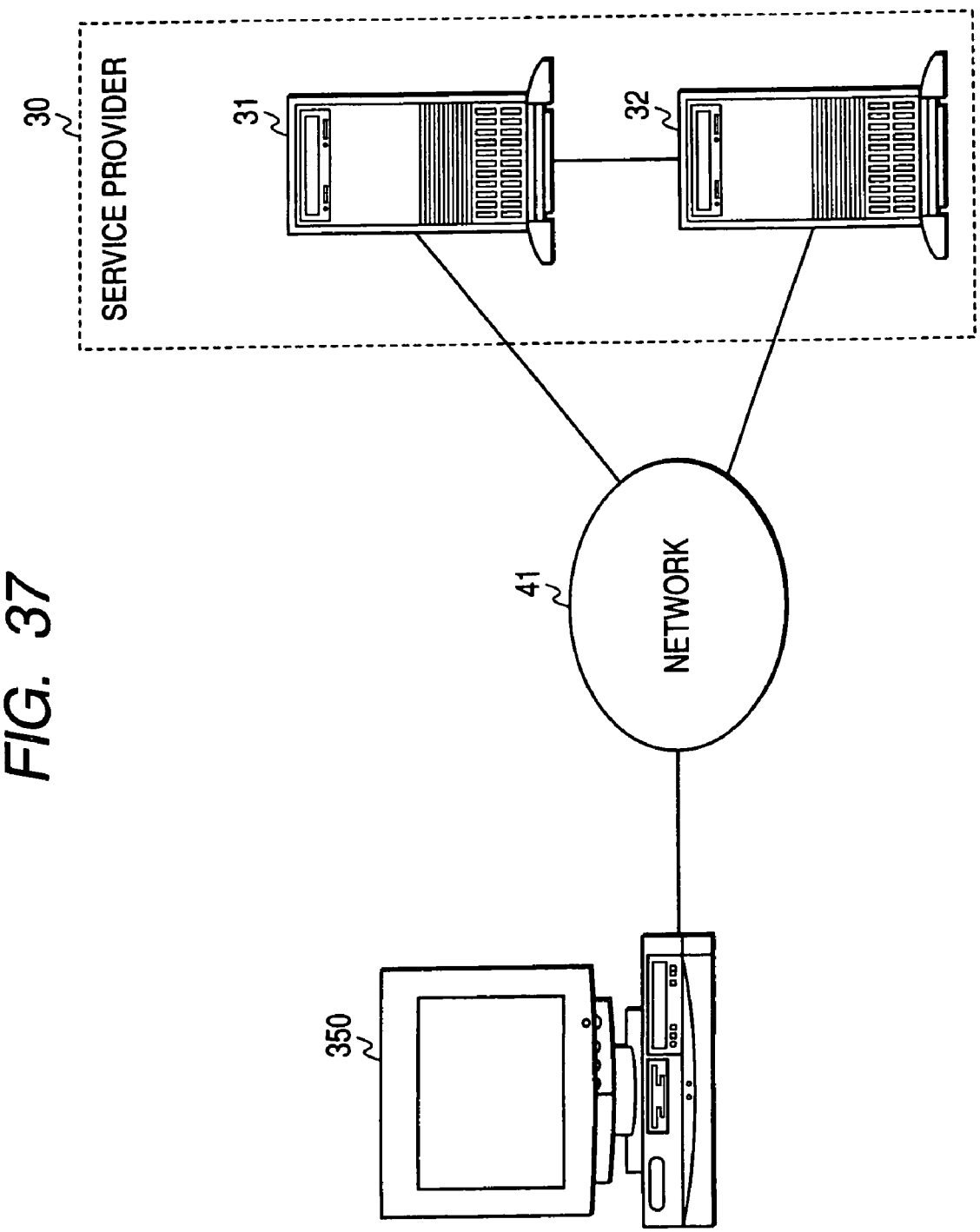
FIG. 37 is a diagram showing another example of the configuration of the EPG providing system to which the invention is applied.

In FIG. 37, a personal computer 500 is connected to the network 41 and is capable of communicating with the EPG server 31 and the editing server 32 of the service provider 30 through the network 41.

Figure 38:
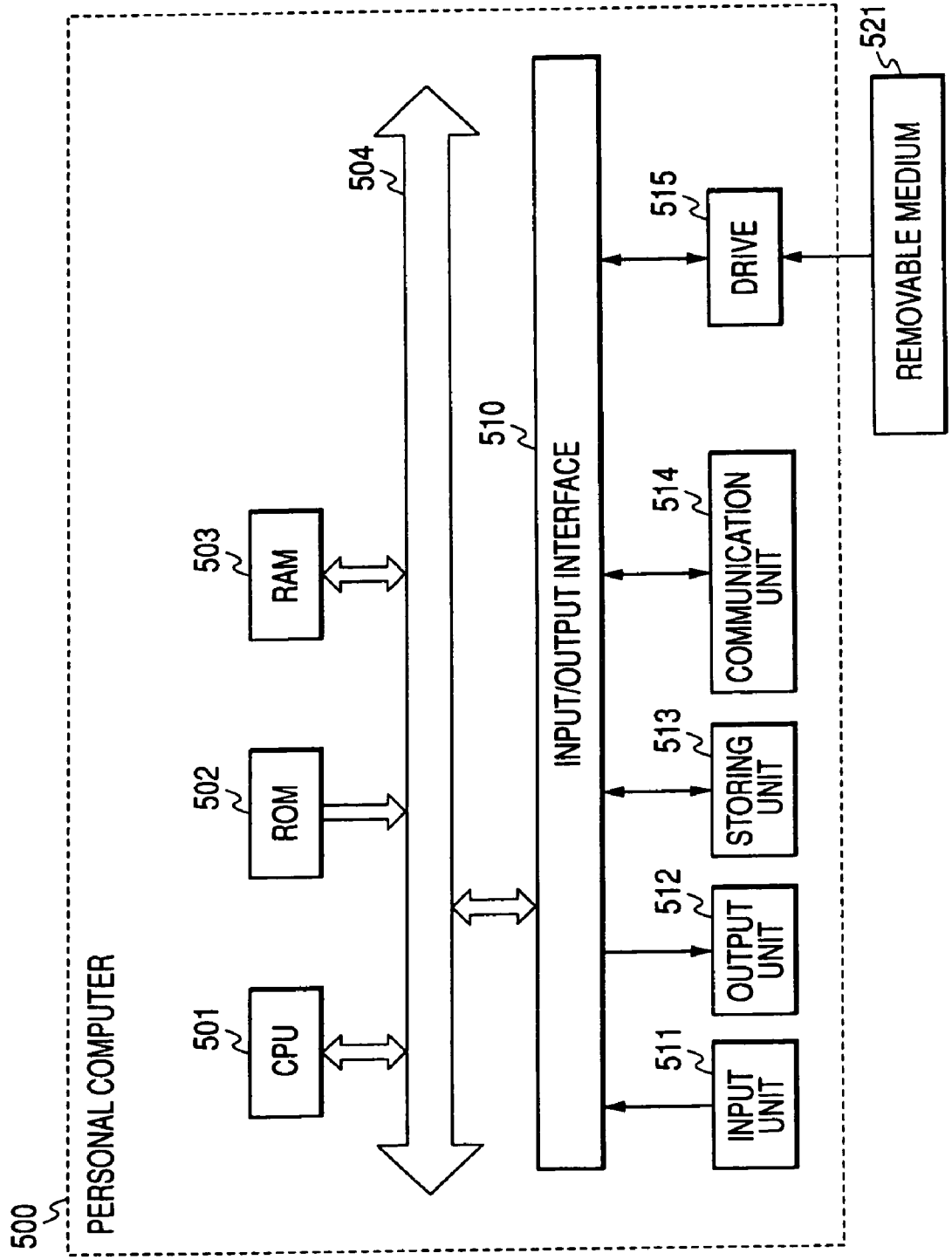
FIG. 38 is a block diagram showing an example of a structure of a personal computer in FIG. 37.

FIG. 38 is a block diagram showing an example of a detailed structure of the personal computer 500 in FIG. 37.

In FIG. 38, a CPU 501 of the personal computer 500 controls respective units of the personal computer 500 in accordance with programs stored in a ROM 502 to executes various kinds of processing. Data, programs, and the like necessary for the CPU 501 to execute the various kinds of processing are stored in a RAM 503 according to circumstances.

The CPU 501, the ROM 502, and the RAM 503 are connected to one another through a bus 504. In addition, an input/output interface 510 is connected to this bus 504.

An input unit 511 constituted by a keyboard or a mouse is connected to the input/output interface 510. The input/output interface 510 outputs a signal input to the input unit 511 to the CPU 501. An output unit 512 constituted by a display, a speaker, or the like is also connected to the input/output interface 510.

Moreover, a storing unit 513 constituted by a hard disk or the like and a communication unit 514, which performs data communication with other apparatuses through the network 41 such as the Internet, are also connected to the input/output interface 510. A drive 515 is used in reading out data from a removable medium 521 constituted by a recording medium such as a magnetic disk, an optical disk, a magneto-optical disk, or a semiconductor memory and in writing data in the removable medium 521.

As in the case of the hard disk 63, such a CPU 501 of the personal computer 500 controls the communication unit 514 to acquire edited EPG information from the edition server 32 and controls the output unit 512 to display the edited EPG information on a display.

Edited EPG information acquisition processing by the CPU 501 is basically the same as that in the case of the hard disk 63 explained with reference to the flowchart of FIG. 14. Thus, a detailed explanation of the edited EPG information acquisition processing is omitted.

As described above, the personal computer 500 acquires edited EPG information from the editing server 32 and causes the display to display the edited EPG information. Thus, the personal computer 500 can provide EPG information that is easier to see for a user.

Note that, as explained with reference to FIGS. 24 to 36, the personal computer 500 may acquire EPG information from the EPG server 31 through the network 41 and generate edited EPG information.

It is also possible to cause hardware to execute the series of processing described above or, as described above, cause software to execute the series of processing. In causing the software to execute the series of processing, programs constituting the software are installed in a computer incorporated in dedicated hardware or a general-purpose personal computer or the like, which is capable of executing various functions by installing various programs therein, from a recording medium or the like.

As shown in FIGS. 4 to 6, FIG. 24, and FIG. 38, the recording medium is constituted not only by the removable medium 121, 171, 235, or 521 including a magnetic disk (including a flexible disk), an optical disk (including a CD-ROM (Compact Disc-Read Only Memory) and a DVD (Digital Versatile Disc)), a magneto-optical disk (including MD (Mini-Disk) (registered trademark)), or a package medium consisting of a semiconductor memory or the like, in which programs are recorded, distributed to provide users with the programs separately from the respective apparatuses but also by the ROM 102, 152, 232, or 502, the storing unit 113 or 163, the program memory 208, the hard disk including the storing unit 513, or the like, in which programs are stored, provided to a user in a state in which the devices are incorporated in a computer.

Note that, in this specification, a step of describing a program to be provided by a medium includes not only processing that is performed in time series in accordance with a described order but also processing that is executed in parallel or individually, although not always processed in time series.

In this specification, a system represents an entire apparatus that includes plural devices.

As described above, according to the invention, it is possible to provide an EPG. In particular, it is possible to provide EPG information, which is easier to see for users, and display the EPG information on a limited screen space effectively.

The invention claimed is:

1. An information processing system, comprising:
a first information processing apparatus connected to a network;
a second information processing apparatus connected to the network for communicating with the first information processing apparatus; and
a third information processing apparatus connected to the network for communicating with the second information processing apparatus;
the first information processing apparatus including:
first supplying means for supplying information regarding each of a plurality of contents to the second information processing apparatus;
the second information processing apparatus including:
first acquiring means for acquiring the information regarding each of the plurality of contents supplied from the first information processing apparatus,
editing means for editing the information regarding each of the plurality of contents to form an image containing the information regarding the plurality of contents, the image having a size larger than can be displayed at one time on a display screen and containing a plurality of displayable image areas, each of the image areas presenting a respective portion of a schedule such that the image area includes a first region which lists the information regarding at least some of the plurality of the contents associated with at least one of a plurality of predetermined times and lists a plurality of associated broadcasting station names, and a second region that is outside of the first region and which contains at least a predetermined mark for receiving user input, wherein each of the image areas contains at least one of: the same predetermined times or the same broadcasting station names, each image area is sized to be displayed in whole upon the display screen, and the image is scrollable upon user operation of at least one of the function button of a currently displayed image area or the predetermined mark of the currently displayed image area to scroll between a first whole one of the image areas and a second whole one of the image areas, and
second supplying means for supplying the edited information regarding content to the third information processing apparatus; and
the third information processing apparatus including:
second acquiring means for acquiring the edited information regarding content from the second information processing apparatus, and
display control means for controlling display of the image corresponding to the edited information regarding content.

2. An information processing apparatus, comprising:
a processor; and
a plurality of instructions executable by the processor to edit information regarding each of a plurality of contents to form an image containing the information regarding the plurality of contents, the image having a size larger than can be displayed at one time on a display screen and containing a plurality of displayable image areas, each of the image areas presenting a respective portion of a schedule such that the image area includes a first region which lists the information regarding at least some of the plurality of the contents associated with at least one of a plurality of predetermined times and lists a plurality of associated broadcasting station names, and a second region that is outside of the first region and which contains at least a predetermined mark for receiving user input, wherein each of the image areas contains at least one of: the same predetermined times or the same broadcasting station names, each image area is sized to be displayed in whole upon the display screen, and the image is scrollable upon user operation of at least one of the function button of a currently displayed image area or the predetermined mark of the currently displayed image area to scroll between a first whole one of the image areas and a second whole one of the image areas.

3. An information processing apparatus according to claim 2, further comprising:
requesting means for requesting the information regarding content from another information processing apparatus that provides the information regarding content; and
acquiring means for acquiring the information regarding content from the another information processing apparatus on the basis of a request from the requesting means, wherein the editing means edits the information regarding content acquired by the acquiring means.

4. An information processing apparatus according to claim 2, further comprising storing means for storing the edited information regarding content.

5. An information processing apparatus according to claim 2, further comprising:
   supplying means for supplying the edited information regarding content to another information processing apparatus.

6. An information processing apparatus according to claim 2, further comprising:
   display control means for controlling display of the first image corresponding to the edited information regarding content.

7. An information processing method, comprising:
   editing the information regarding each of the plurality of contents to form an image containing the information regarding the plurality of contents, the image having a size larger than can be displayed at one time on a display screen and containing a plurality of displayable image areas, each of the image areas presenting a respective portion of a schedule such that the image area includes a first region which lists the information regarding at least some of the plurality of the contents associated with at least one of a plurality of predetermined times and lists a plurality of associated broadcasting station names, and a second region that is outside of the first region and which contains at least a predetermined mark for receiving user input, wherein each of the image areas contains at least one of: the same predetermined times or the same broadcasting station names, each image area is sized to be displayed in whole upon the display screen, and the image is scrollable upon user operation of at least one of the function button of a currently displayed image area or the predetermined mark of the currently displayed image area to scroll between a first whole one of the image areas and a second whole one of the image areas.

8. A computer-readable recording medium having recorded therein a computer readable computer program executable by a processor to perform a method of editing information regarding a plurality of contents for display on a display screen, the method comprising:
   editing the information regarding each of the plurality of contents to form an image containing the information regarding the plurality of contents, the image having a size larger than can be displayed at one time on a display screen and containing a plurality of displayable image areas, each of the image areas presenting a respective portion of a schedule such that the image area includes a first region which lists the information regarding at least some of the plurality of the contents associated with at least one of a plurality of predetermined times and lists a plurality of associated broadcasting station names, and a second region that is outside of the first region and which contains at least a predetermined mark for receiving user input, wherein each of the image areas contains at least one of: the same predetermined times or the same broadcasting station names, each image area is sized to be displayed in whole upon the display screen, and the image is scrollable upon user operation of at least one of the function button of a currently displayed image area or the predetermined mark of the currently displayed image area to scroll between a first whole one of the image areas and a second whole one of the image areas.

9. An information processing system, comprising:
   a first information processing apparatus connected to a network; and
   a second information processing apparatus connected to the network for communicating with the first information processing apparatus;
   the first information processing apparatus including:
      first supplying means for supplying information regarding each of a plurality of contents to the second information processing apparatus; and
   the second information processing apparatus including:
      first acquiring means for acquiring the information regarding each of the plurality of contents from the first information processing apparatus,
      editing means for editing the information regarding each of the plurality of contents to form an image containing the information regarding the plurality of contents, the image having a size larger than can be displayed at one time on a display screen and containing a plurality of displayable image areas, each of the image areas presenting a respective portion of a schedule such that the image area includes a first region which lists the information regarding at least some of the plurality of the contents associated with at least one of a plurality of predetermined times and lists a plurality of associated broadcasting station names, and a second region that is outside of the first region and which contains at least a predetermined mark for receiving user input, wherein each of the image areas contains at least one of: the same predetermined times or the same broadcasting station names, each image area is sized to be displayed in whole upon the display screen, and the image is scrollable upon user operation of at least one of the function button of a currently displayed image area or the predetermined mark of the currently displayed image area to scroll between a first whole one of the image areas and a second whole one of the image areas, and
      display control means for controlling display of the image corresponding to the edited information regarding content.

* * * * *